(12) United States Patent
Ober et al.

(10) Patent No.: US 9,574,046 B1
(45) Date of Patent: Feb. 21, 2017

(54) METHOD OF FORMING POLYARYL POLYMERS AND POLYMERS FORMED THEREBY

(71) Applicant: DOW Global Technologies LLC, Midland, MI (US)

(72) Inventors: Matthias S. Ober, Midland, MI (US); Arkady Krasovskiy, Midland, MI (US); Patrick Hanley, Midland, MI (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 0 days.

(21) Appl. No.: 14/828,628

(22) Filed: Aug. 18, 2015

(51) Int. Cl.
 *C08G 79/00* (2006.01)
 *C08G 61/12* (2006.01)
 *C08G 61/10* (2006.01)

(52) U.S. Cl.
 CPC ........... *C08G 61/128* (2013.01); *C08G 61/10* (2013.01)

(58) Field of Classification Search
 CPC ........ C08G 65/40; C08G 75/23; C08G 75/20; C09D 181/06
 See application file for complete search history.

(56) References Cited

U.S. PATENT DOCUMENTS

| | | | |
|---|---|---|---|
| 3,733,304 A | 5/1973 | Firth, Jr. | |
| 3,773,304 A * | 11/1973 | Hodgson | B28C 5/422 366/44 |
| 5,204,442 A | 4/1993 | Nye | |
| 2015/0025278 A1 | 1/2015 | Ober et al. | |

OTHER PUBLICATIONS

Restriction Requirement mailed Apr. 8, 2016; U.S. Appl. No. 14/828,661, filed Aug. 18, 2015 (6 pages).
Non-Final Office Action dated Aug. 12, 2016; U.S. Appl. No. 14/828,661, filed Aug. 18, 2015 (10 pages).
Hanley, et al., "Nickel- and Palladium-Catalyzed Coupling of Aryl Fluorosulfonates with Aryl Boronic Acids Enabled by Sulfuryl Fluoride" ACS Catal. Jul. 14, 2015, 5, 5041-5046.
Hanley, et al., "Suzuki Coupling of Aryl Fluorosulfonates Enabled by Sulfuryl Fluoride" OPRD Toronto, Jul. 15, 2015 (32 pages).
Hedayatullah et al., "Sur la synthese de fluorosufates d'aryle", C. R. Acad. Sc. Paris, t. 278, Serie C, pp. 57-59 (Jan. 2, 1974)—with English abstract.
Hopf, et al., From p-Dimethoxybenzene toward Crown Benzenophanes: 1,3,10,14-Tetraoxa[3.5]paracyclophane, J. Org. Chem. 1992, 57, 5509-5517.
Karakaya, et al., "Full Coverage of a Hydroxy-Substituted Poly(para-phenylene) With First- and Second-Generation Dendritic Wedges Having Isocyanate Focal Points", Acta Polymer, 47, (1996) 79-84.

(Continued)

*Primary Examiner* — Shane Fang
(74) *Attorney, Agent, or Firm* — Cantor Colburn LLP

(57) ABSTRACT

In a method of forming a polyaryl polymer, a fluorosulfonate-containing monomer is coupled with itself or a boron-containing comonomer in the presence of a catalyst and a base. The resulting polymers can be used as precursors to electrically conducting polymers, and as components of resist or underlayer compositions for photolithography, among other applications.

10 Claims, 1 Drawing Sheet

1

(56) References Cited

OTHER PUBLICATIONS

Liang, et al. "Palladium-Catalyzed, Ligand-Free Suzuki Reaction in Water Using Aryl Fluorosulfates" Org. Lett. Apr. 9, 2015, 17, 1942-1945.
Misuraca, et al. "Relationship Between Conformational Flexibility and Chelate Cooperativity" The Journal of Organic Chemistry, 2011, 76, 2723-2732.
Newman, et al. "Studies on the Monoalkylation of Hydroquinone", J. Org. Chem., vol. 39, No. 2, 1974, pp. 214-215.
Ober et al., U.S. Appl. No. 14/828,661, filed Aug. 18, 2015.
Scheler, et al. "Synthesis and Properties of Alternating Fluorene-Based Oligomers for Sub-um Photopatterning", Macromolecular Chemistry and Physics, 2010, 211, 2081-2089.

* cited by examiner

METHOD OF FORMING POLYARYL POLYMERS AND POLYMERS FORMED THEREBY

FIELD

The present invention relates to a method of synthesizing polyaryl polymers using fluorosulfonyl-substituted monomers.

INTRODUCTION

Polyaryl polymers in which aryl groups are directly bonded to each other are useful in a variety of applications, including as precursors to conductive and semiconductive polymers for use in Organic Light Emitting Diodes (OLED) and Polymeric Light Emitting Diodes (PLED), as acid-sensitive polymers and highly etch-resistant polymers for photolithography, and as pH-sensitive drug delivery encapsulants.

Ober U.S. Pat. No. 8,962,779 B2 describes forming polyacetal and polyketal polymers by coupling an acetal- or ketal-containing monomer with itself or a comonomer in the presence of a catalyst and a base. The aryl-aryl coupling reaction involves the reaction of a first functional group directly bound to an aryl group and selected from chloro, bromo, iodo, mesylate, tosylate, or triflate with a second functional group that is a boron-containing functional group in which the boron atom is directly bound to an aryl group. While the Ober polymerization method works well, it is known to be sensitive to impurities in the aryl halide. Also, the synthesis and handling of aryl mesylates, tosylates, and triflates adds cost and complexity to the polymerization process.

There is therefore a desire for a simpler polymerization method that does not require a monomer substituted with a chloro, bromo, iodo, mesylate, tosylate, or triflate group.

SUMMARY

One embodiment is a method of forming a polyaryl polymer, the method comprising: reacting a monomer in the presence of a catalyst and a base to form a polymer; wherein the monomer comprises (a) a first monomer having structure (1)

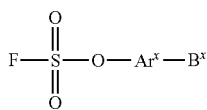

(1)

wherein $Ar^x$ is unsubstituted or substituted $C_{6-43}$ arylene, or unsubstituted or substituted $C_{3-43}$ heteroarylene; and $B^x$ is a boron-containing functional group bonded to $Ar^x$ via a boron atom; or (b) a first comonomer having structure (2) and a second comonomer having structure (3)

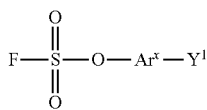

(2)

(3)

wherein $Ar^x$ is independently at each occurrence unsubstituted or substituted $C_{6-24}$ arylene, or unsubstituted or substituted $C_{3-24}$ heteroarylene; $Y^1$ is chloro, bromo, iodo, mesylate, tosylate, triflate, sulfonyl fluoride, sulfonyl chloride, sulfonyl bromide, or sulfonyl iodide; and $B^x$ is independently at each occurrence a boron-containing functional group bonded to $Ar^x$ via a boron atom.

This and other embodiments are described in detail below.

DETAILED DESCRIPTION

Figure 1:
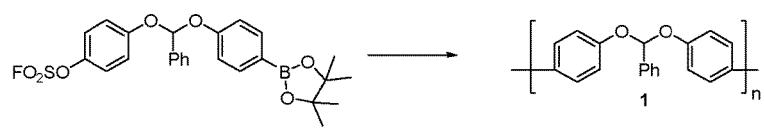
FIG. 1 is a chemical scheme for polymerization of a monomer comprising a fluorosulfonyl groups and a dioxaborolanyl group.

The present inventors have determined that polyaryl polymers can be produced by the catalyzed reaction of an aryl fluorosulfonyl group with a boron-functionalized aryl group. The two functional group types can reside on the same monomer, which can be polymerized with itself, or on different monomers, which can be copolymerized. The fluorosulfonyl-substituted aryl monomer can be prepared in situ by reaction of the corresponding phenol with sulfuryl fluoride ($FS(O)_2F$), and used without purification other than degassing. The fluorosulfonyl-substituted aryl monomer thus provides a more convenient and less expensive alternative to the chloro-, bromo-, iodo-, mesylate-, tosylate-, or triflate-substituted monomers used in prior art methods.

As used herein, "substituted" means including at least one substituent such as a halogen (i.e., F, Cl, Br, I), hydroxyl, amino, thiol, carboxyl, carboxylate, amide, nitrile, sulfide, disulfide, nitro, $C_{1-18}$ alkyl, $C_{1-18}$ alkoxyl, $C_{6-18}$ aryl, $C_{6-18}$ aryloxyl, $C_{7-18}$ alkylaryl, or $C_{7-18}$ alkylaryloxyl. It will be understood that any group or structure disclosed with respect to the formulas herein may be so substituted unless otherwise specified, or where such substitution would significantly adversely affect the desired properties of the resulting structure. Also, "fluorinated" means having one or more fluorine atoms incorporated into the group. For example, where a $C_{1-18}$ fluoroalkyl group is indicated, the fluoroalkyl group can include one or more fluorine atoms, for example, a single fluorine atom, two fluorine atoms (e.g., as a 1,1-difluoroethyl group), three fluorine atoms (e.g., as a 2,2,2-trifluoroethyl group), or fluorine atoms at each free valence of carbon (e.g., as a perfluorinated group such as —$CF_3$, —$C_2F_5$, —$C_3F_7$, or —$C_4F_9$).

As used herein, "alkyl", whether alone or as part of another group (e.g., in dialkylamino), encompasses straight and branched chain aliphatic groups having the indicated number of carbon atoms. If no number is indicated (e.g., aryl-alkyl-), then 1-6 alkyl carbons are contemplated. Preferred alkyl groups include, without limitation, methyl, ethyl, propyl, isopropyl, butyl, isobutyl, sec-butyl, tert-butyl, pentyl, and hexyl.

As used herein, "cycloalkyl", whether alone as part of another group, encompasses fully saturated aliphatic cyclic groups having the indicated number of carbon atoms. In no number of carbon atoms is indicated, then 3 to 12 atoms are contemplated. Preferred cycloalkyl groups include cyclopropyl, cyclobutyl, cyclopropyl, 1-methylcyclopropyl, cyclohexyl, cyclooctyl, cyclodecyl, and cyclododecyl.

As used herein, "aryl" is an aromatic moiety comprising one to three aromatic rings. In one instance, the aryl group is a $C_{6-18}$ aryl group. In some embodiments, the aryl group is a $C_{6-10}$ aryl group. In some embodiments, the aryl group is a $C_{10-18}$ aryl group. Aryl groups contain 4n+2 pi electrons, where n is an integer. Preferred aryls include, without limitation, phenyl, biphenyl, naphthyl, anthracenyl, phenanthrenyl, pyrenyl, and fluorenyl. Unless otherwise indicated, the aryl group is optionally substituted with 1 or more substituents that are compatible with the syntheses described herein. Such substituents include, but are not limited to, sulfonate groups, boron-containing groups, $C_{1-6}$ alkyl, nitro, halogen, cyano, carboxylic acids (e.g., $C_{0-6}$—COOH), esters, amides, and $C_2$-$C_6$ alkenyl. Other substituents are known in the art. Unless otherwise indicated, the foregoing substituent groups are not themselves further substituted.

As used herein, "heteroaryl" refers to an aromatic ring system containing at least one heteroatom selected from nitrogen, oxygen, and sulfur. Preferably, the heteroaryl group is a five or six-membered ring. The heteroaryl ring may be fused or otherwise attached to one or more heteroaryl rings, aromatic or non-aromatic hydrocarbon rings or heterocycloalkyl rings. Examples of heteroaryl groups include, without limitation, pyridine, pyrimidine, pyridazine, pyrazine and furan. The heteroaryl group may be optionally substituted with 1 or more substituents that are compatible with the syntheses described herein. Such substituents include, but are not limited to, fluorosulfonate groups, boron-containing groups, $C_{1-6}$ alkyl, nitro, halogen, cyano, carboxylic acids (e.g., $C_{0-6}$—COOH), esters, amides and $C_{2-6}$ alkene. Other substituents are known in the art. Unless otherwise indicated, the foregoing substituent groups are not themselves further substituted.

One embodiment is a method of forming a polyaryl polymer, the method comprising: reacting a monomer in the presence of a catalyst and a base to form a polymer; wherein the monomer comprises (a) a first monomer having structure (1)

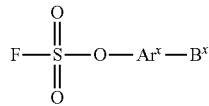

(1)

wherein $Ar^x$ is unsubstituted or substituted $C_{6-43}$ arylene, or unsubstituted or substituted $C_{3-43}$ heteroarylene; and $B^x$ is a boron-containing functional group bonded to $Ar^x$ via a boron atom; or (b) a first comonomer having structure (2) and a second comonomer having structure (3)

(2)

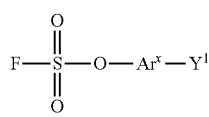

$B^x$—$Ar^x$—$B^x$ (3)

wherein $Ar^x$ is independently at each occurrence unsubstituted or substituted $C_{6-24}$ arylene, or unsubstituted or substituted $C_{3-24}$ heteroarylene; $Y^1$ is chloro, bromo, iodo, mesylate, tosylate, triflate, or sulfonyl fluoride; and $B^x$ is independently at each occurrence a boron-containing functional group bonded to $Ar^x$ via a boron atom.

In structures (1), (2), and (3), each occurrence of $Ar^x$ is independently unsubstituted or substituted $C_{6-43}$ arylene, or unsubstituted or substituted $C_{3-43}$ heteroarylene. Examples of $Ar^x$ groups include

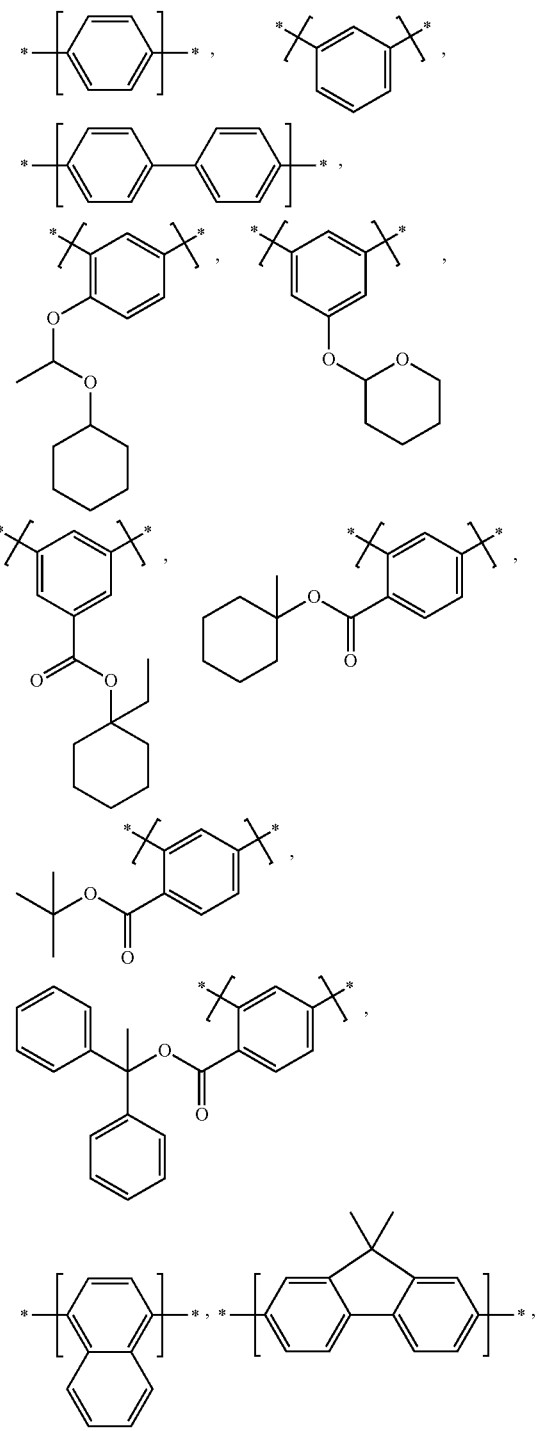

-continued

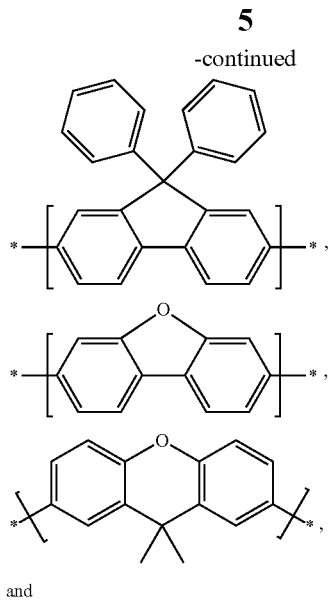

and

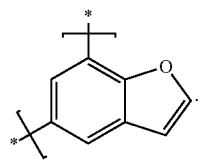

In some embodiments of structures (1), (2), and (3), Ar$^x$ includes an acetal or ketal groups that becomes incorporated into the main chain of the resulting polymer. In these embodiment, Ar$^x$ can have structure (7)

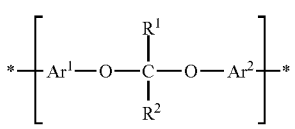 (7)

wherein Ar$^1$ and Ar$^2$ are each independently unsubstituted or substituted C$_{6-18}$ arylene, or unsubstituted or substituted C$_{3-18}$ heteroarylene, provided that the sum of carbon atoms in Ar$^1$ and Ar$^2$ is 9 to 24; and R$^3$ and R$^4$ are each independently hydrogen, unsubstituted or substituted C$_{1-18}$ linear or branched alkyl, unsubstituted or substituted C$_{3-18}$ cycloalkyl; unsubstituted or substituted C$_{6-18}$ aryl, or unsubstituted or substituted C$_{3-18}$ heteroaryl; and R$^1$ and R$^2$ are optionally covalently linked to each other to form a ring that includes
—R$^1$—C—R$^2$—. Examples of Ar$^x$ having structure (7) include

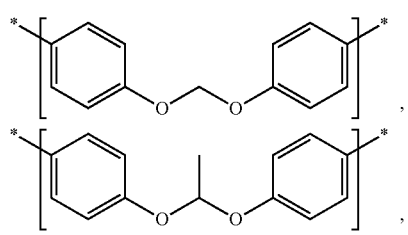

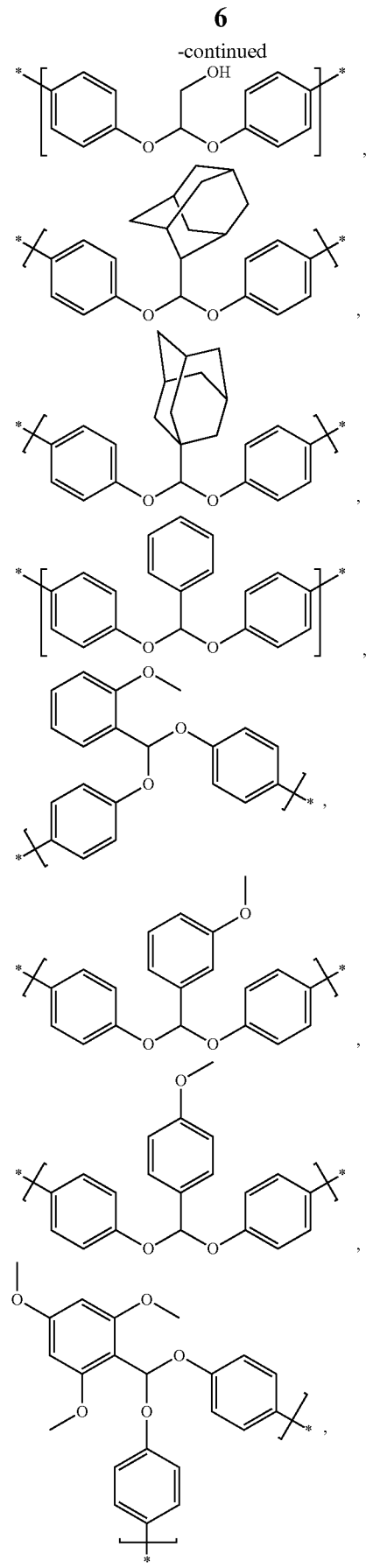

7
-continued
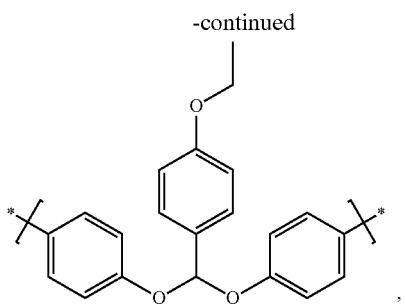
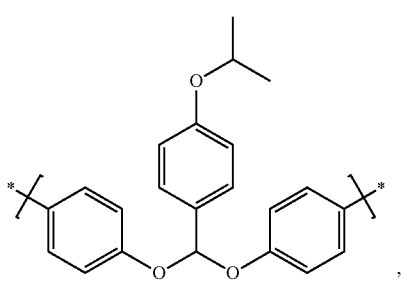
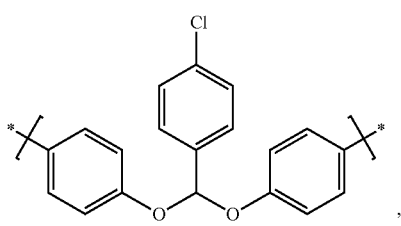
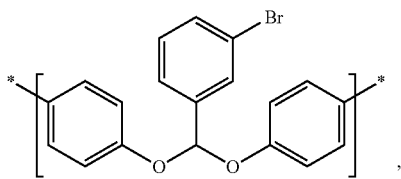
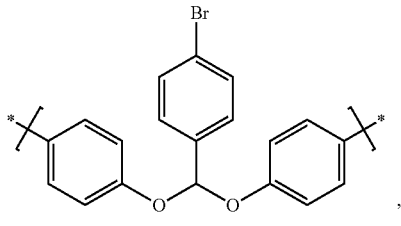
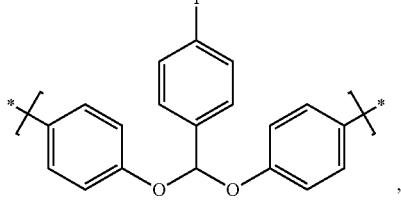
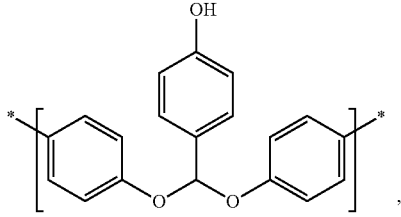
8
-continued
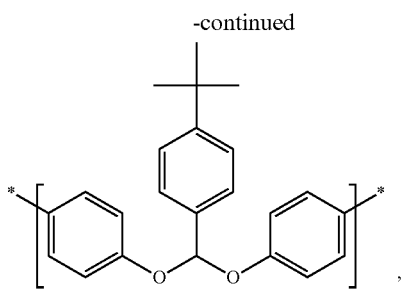
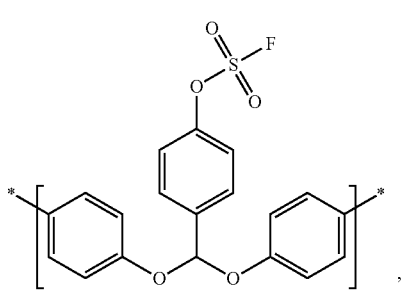
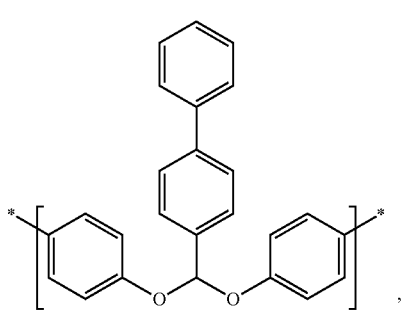
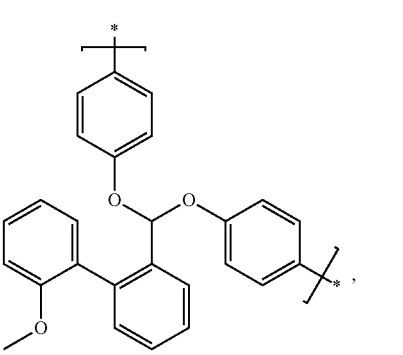
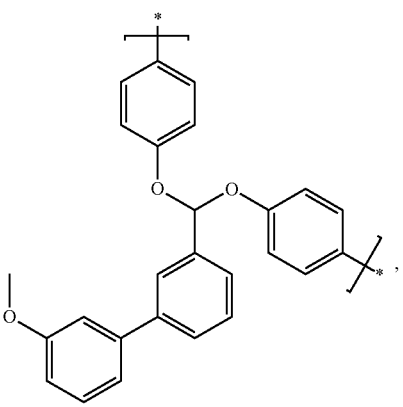

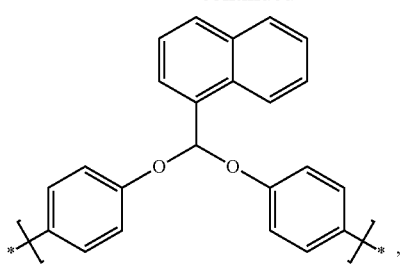
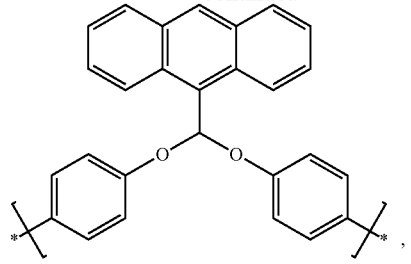
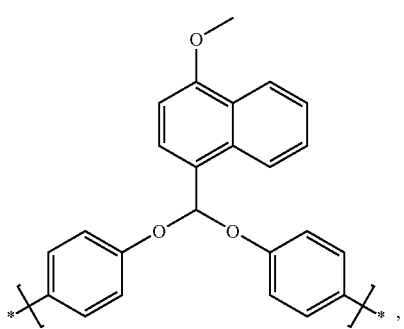
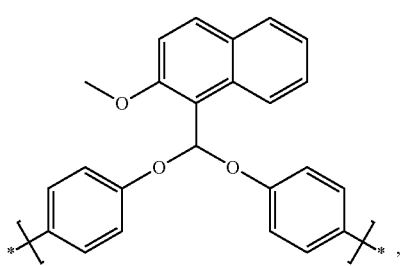
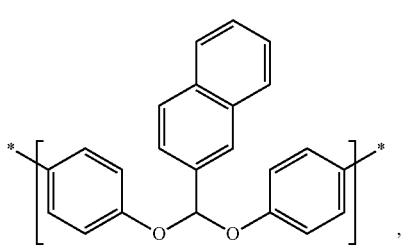
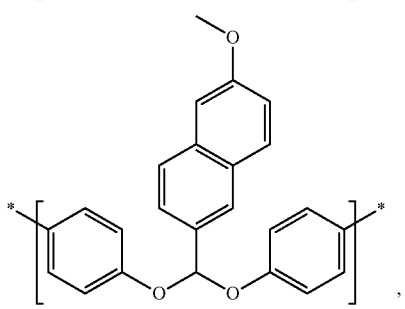
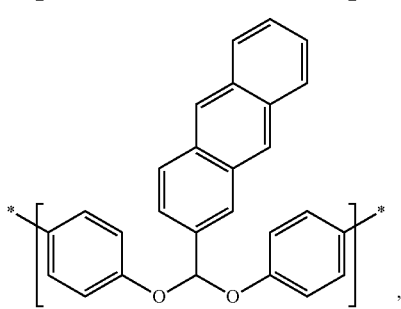

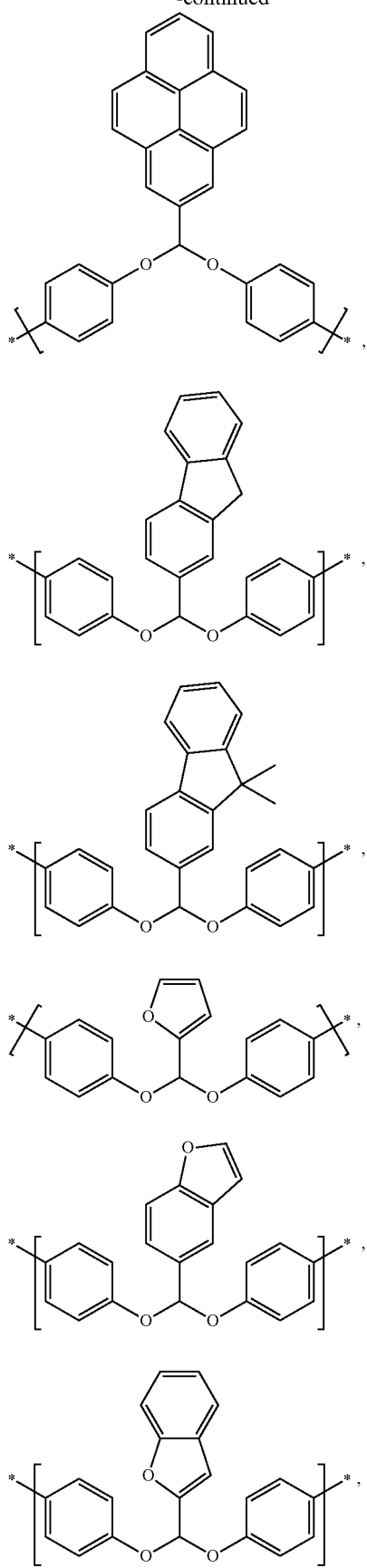
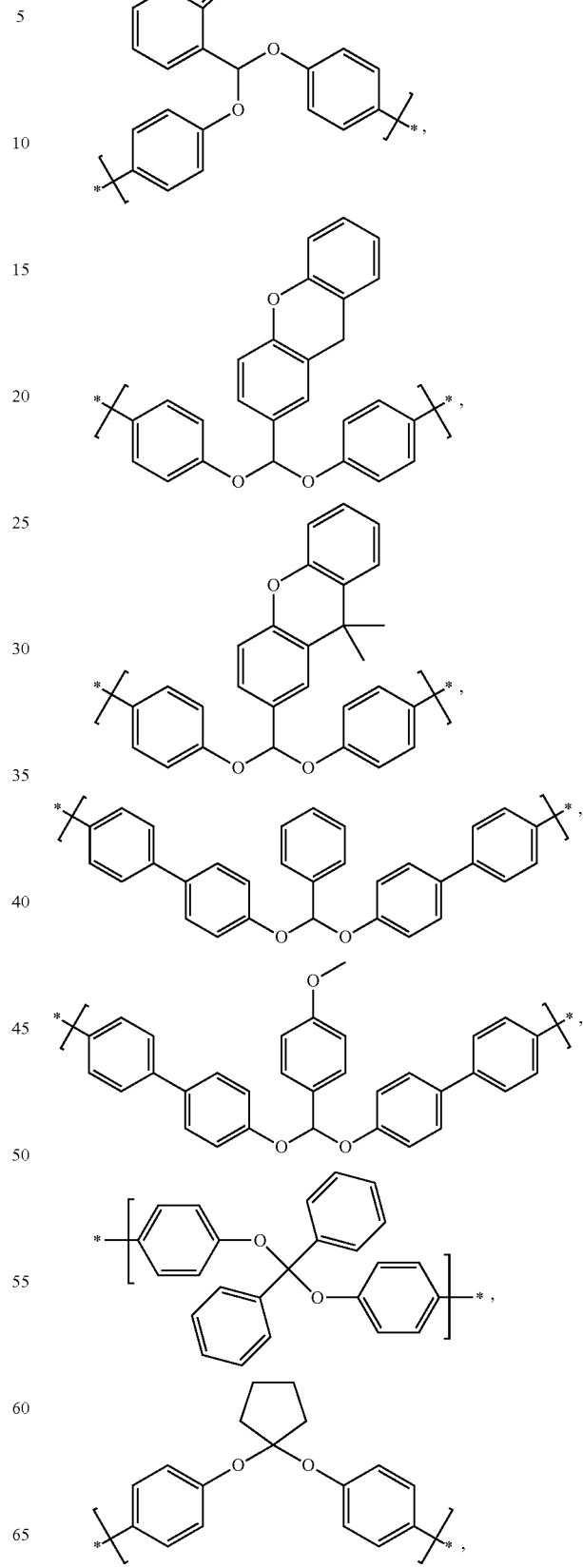

-continued

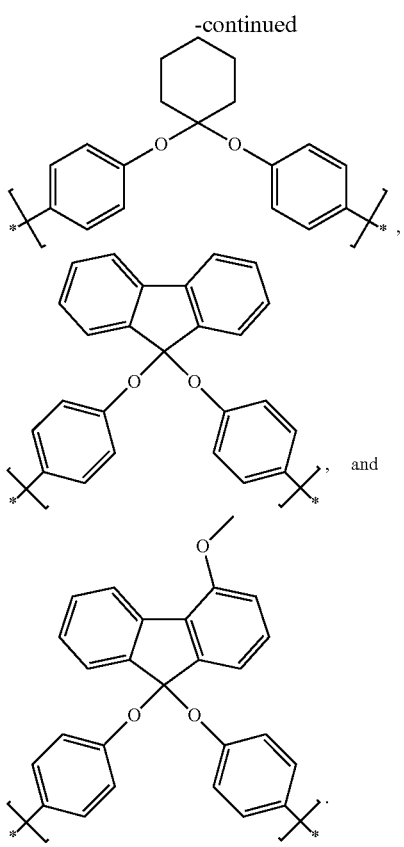
and

In structures (1) and (3), each occurrence of $B^x$ is independently a boron-containing functional group bonded to $Ar^x$ via a boron atom. Examples of $B^x$ include —$BF_3^-M^+$, wherein each occurrence of $M^+$ is independently an alkali metal cation, or an unsubstituted or substituted ammonium ion; —$B(OH)_2$;

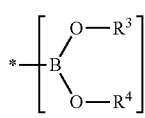

wherein $R^3$ and $R^4$ are each independently $C_{1-18}$ alkyl, $C_{3-18}$ cycloalkyl, or $C_{6-18}$ aryl; and $R^3$ and $R^4$ are optionally covalently linked to each other to form a ring that includes —$R^3$—O—B—O—$R^4$—; and

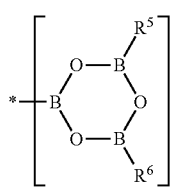

wherein $R^5$ and $R^6$ are each independently hydrogen, unsubstituted or substituted $C_{1-12}$ linear or branched alkyl, unsubstituted or substituted $C_{3-12}$ cycloalkyl, unsubstituted or substituted $C_{6-12}$ aryl, unsubstituted or substituted $C_{3-12}$ heteroaryl, or

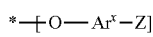

wherein $Ar^x$ is defined as in structure (1); and wherein Z is chloro, bromo, iodo, mesylate, tosylate, triflate, sulfonyl fluoride, or $B^z$ wherein $B^z$ is selected from the group consisting of —$BF_3^-M^+$, wherein each occurrence of $M^+$ is independently an alkali metal cation, or an unsubstituted or substituted ammonium ion; —$B(OH)_2$;

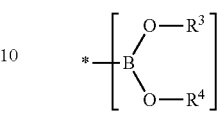

wherein $R^3$ and $R^4$ are each independently $C_{1-18}$ alkyl, $C_{3-18}$ cycloalkyl, or $C_{6-18}$ aryl; and $R^3$ and $R^4$ are optionally covalently linked to each other to form a ring that includes —$R^3$—O—B—O—$R^4$—.

Specific examples of $B^x$ include

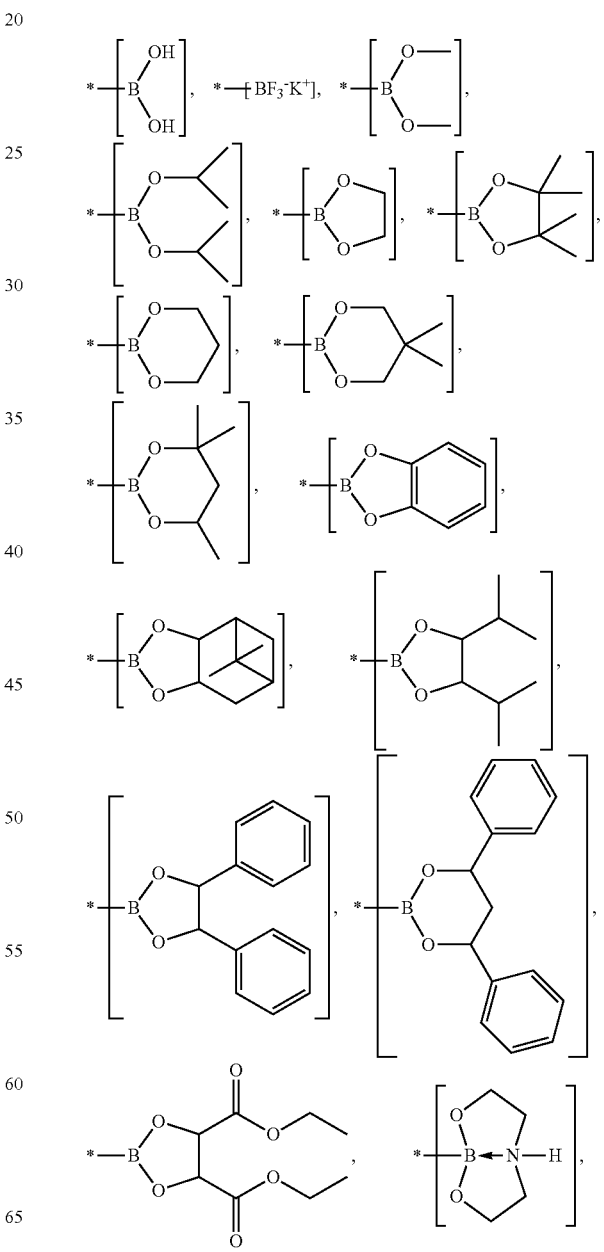

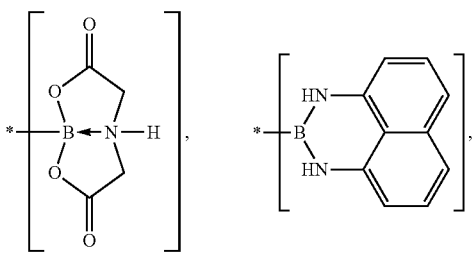

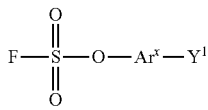

(2)

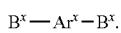

(3)

In structures (2) and (3), $Ar^x$ is defined as it is for structure (1). It will be understood that $Ar^x$ groups in structures (2) and (3) are defined independently. In structure (3), $B^x$ is defined as for structure (1). $B^x$ groups in structures (1) and (3) are defined independently. In structure (2), $Y^1$ is chloro, bromo, iodo, mesylate, tosylate, triflate, or sulfonyl fluoride. Among these, sulfonyl fluoride is preferred.

In some embodiments, the monomer comprises the first monomer having structure (1). In other embodiments, the monomer comprises the first comonomer having structure (2) and the second comonomer having structure (3). It is also possible that the monomer comprises the first monomer having structure (1), the first comonomer having structure (2), and the second comonomer having structure (3).

One of the advantages of the invention is that monomers with fluorosulfonyl groups can be formed in situ from the corresponding phenols. Thus, in some embodiments the method further comprises forming in situ the first monomer having structure (1) by reacting sulfuryl fluoride $(S(O)_2F_2)$ with a first monomer precursor having structure (4)

 (4)

wherein $Ar^x$ and $B^x$ are defined for structure (1). The comonomer having structure (2) can be formed in situ instead of or in addition to the monomer having structure (1). Thus, in some embodiments, the method further comprises forming in situ the first comonomer having structure (2) by reacting sulfuryl fluoride with a first comonomer precursor having structure (5) or structure (6)

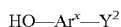 (5)

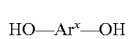 (6)

wherein $Ar^x$ is defined as for structure (2); and $Y^2$ is chloro, bromo, iodo, mesylate, tosylate, or triflate.

In some embodiments, in structure (1) $Ar^x$ is substituted with at least one functional group selected from the group consisting of hydroxyl, acetals, ketals, esters, and lactones; and in structure (2) or structure (3) or both structure (2) and structure (3), $Ar^x$ is substituted with at least one functional group selected from the group consisting of hydroxyl, acetals, ketals, esters, and lactones. In this context, acetals, ketals, esters, and lactones can be monovalent or divalent substituents.

In very specific embodiments, the monomer comprises the first monomer having structure (1), and the first monomer having structure (1) is selected from the group consisting of

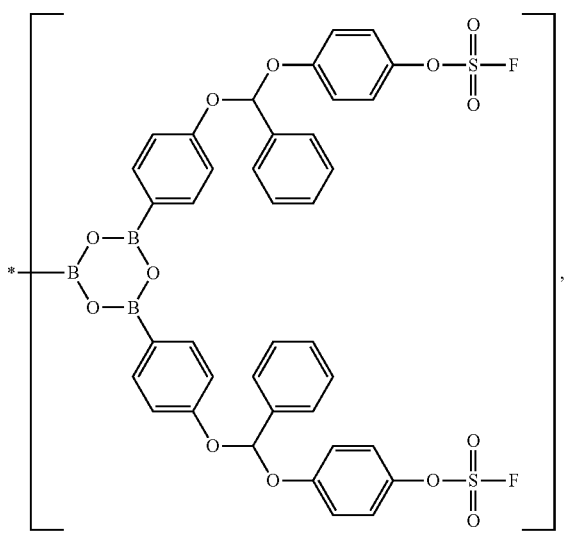

and

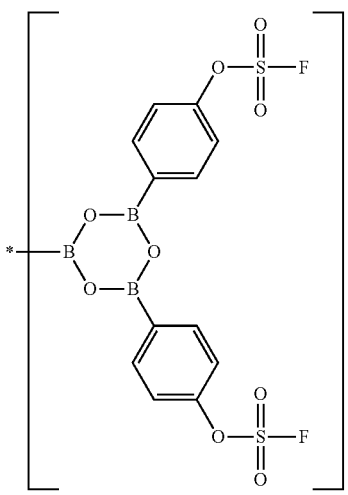

In some embodiments, the monomer comprises two comonomers, the first comonomer having at least one fluorosulfonyl group, and the second comonomer having two boron-containing functional groups. In these embodiments, the first comonomer can have structure (2), and the second comonomer can have structure (3)

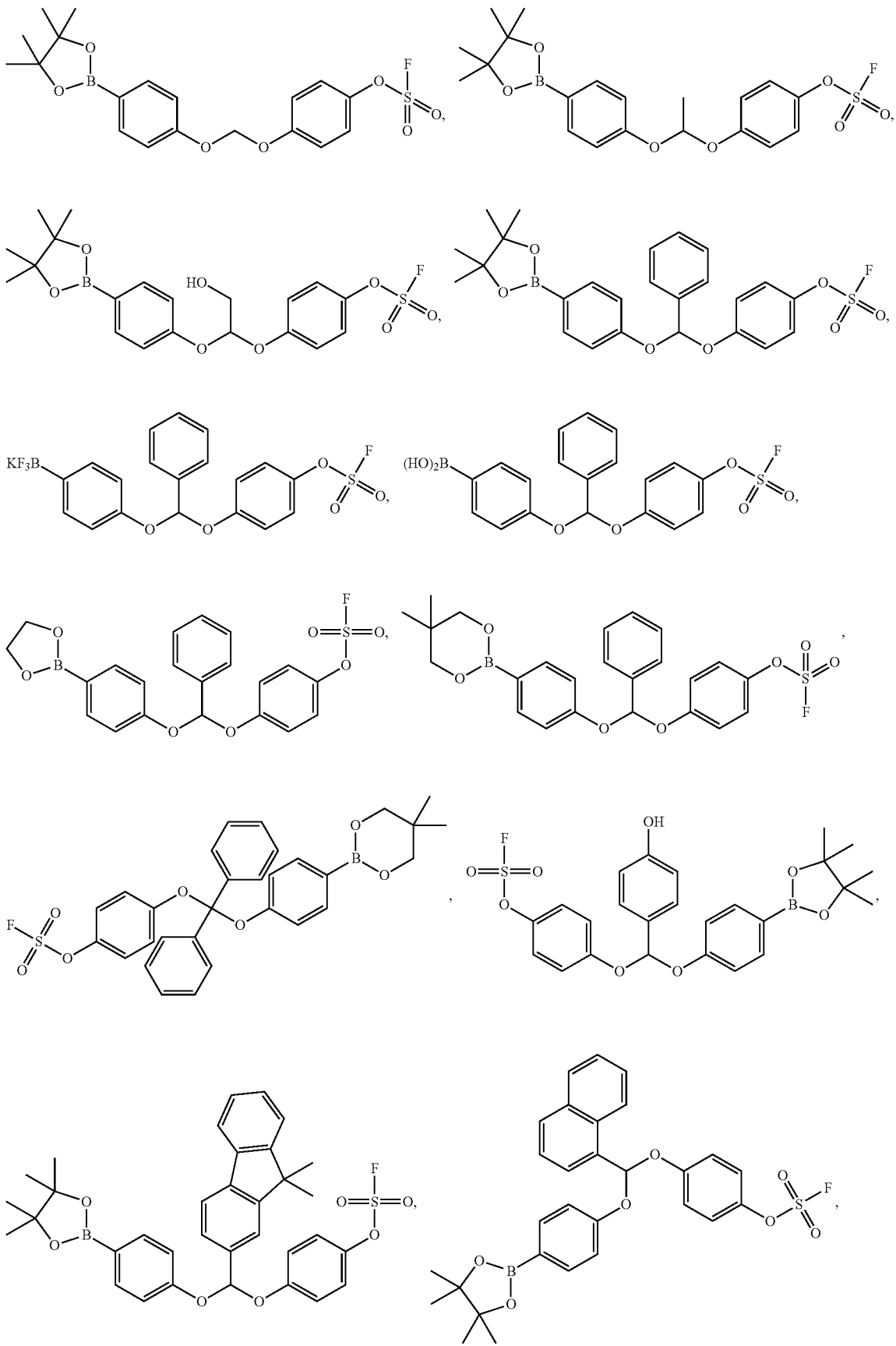

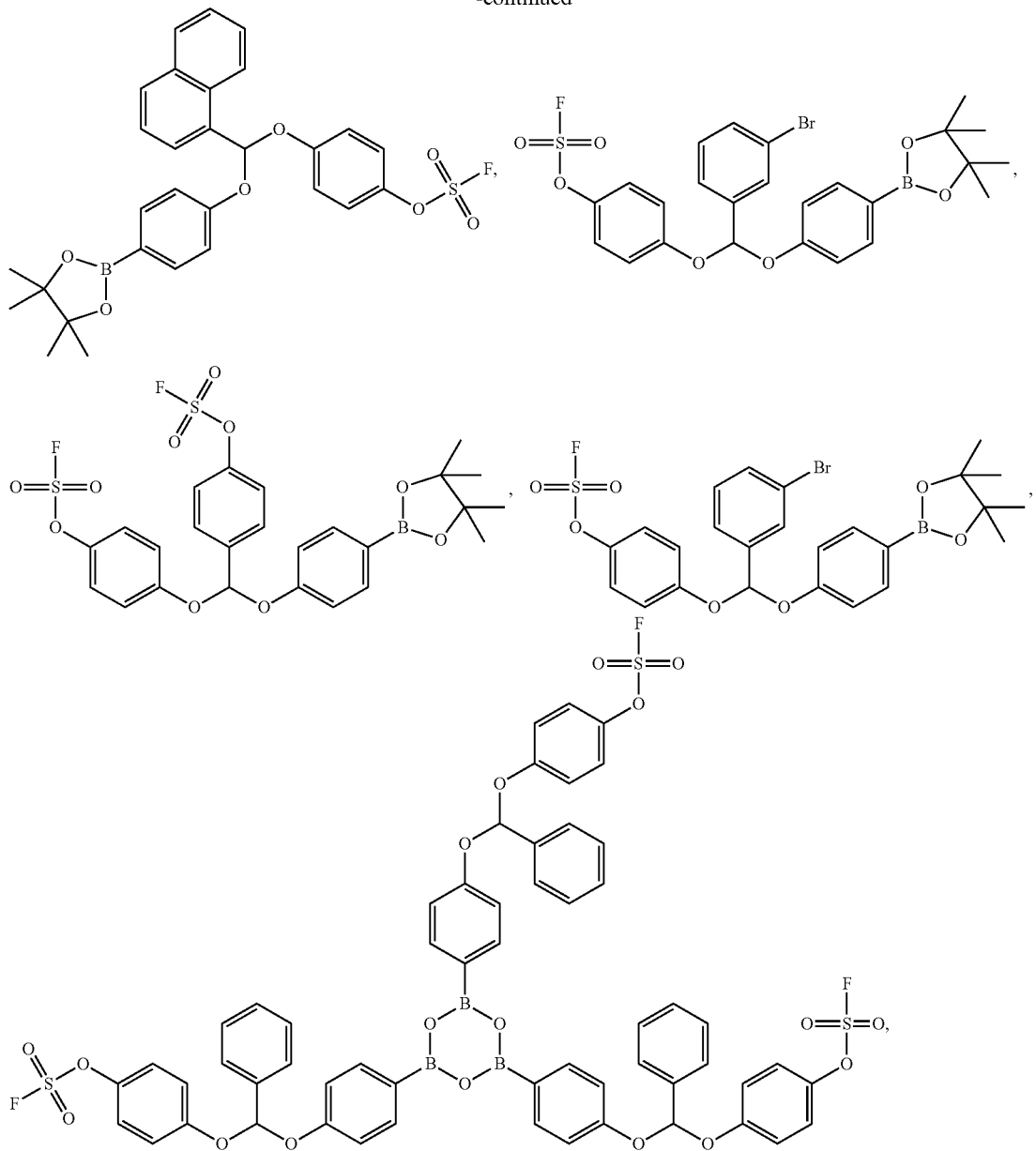
and combinations thereof, or the monomer comprises the first comonomer having structure (2) and the second comonomer having structure (3), and the first comonomer having structure (2) is selected from the group consisting of
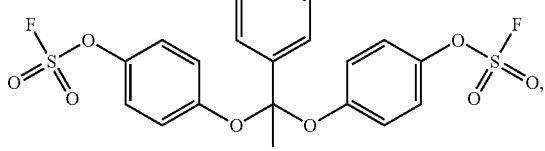
-continued
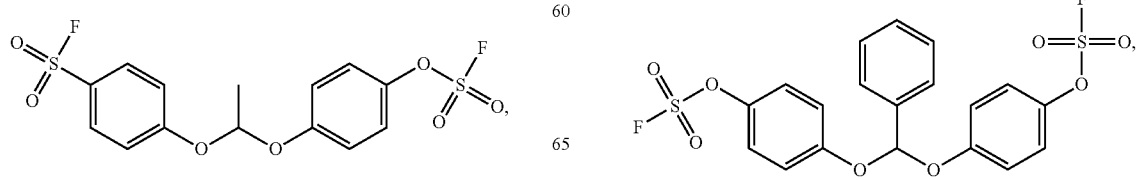

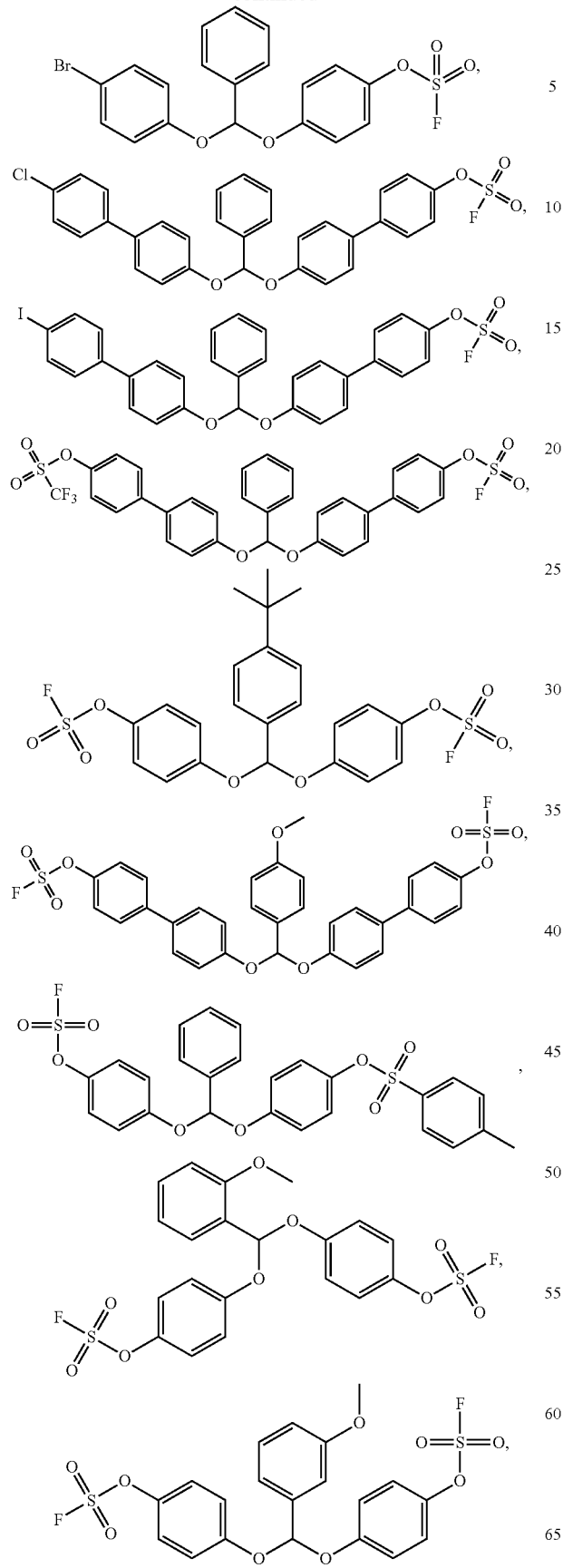
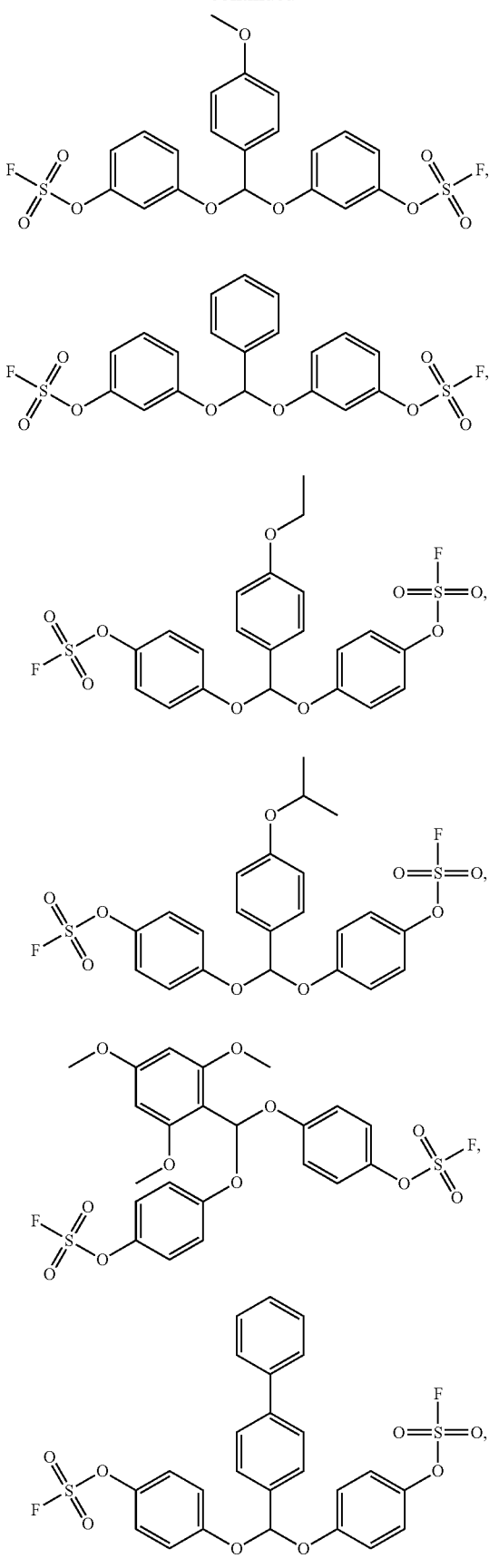

23
-continued
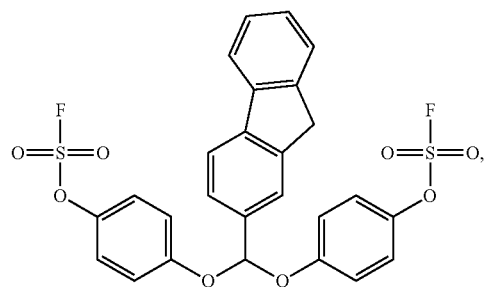
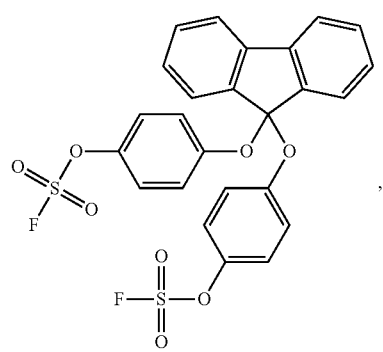
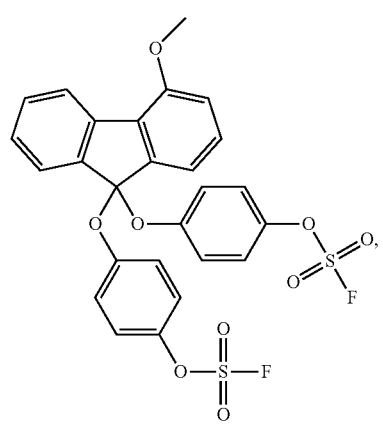
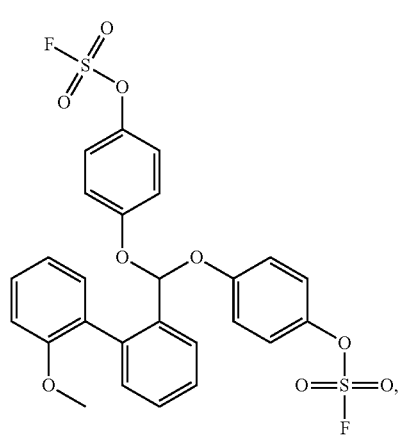
24
-continued
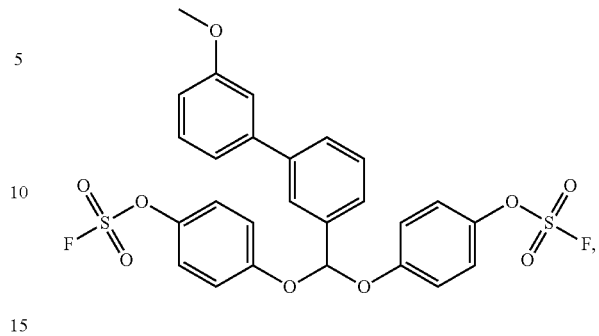
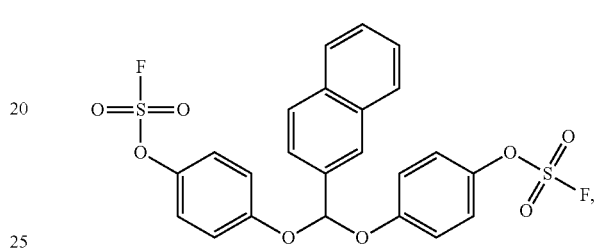
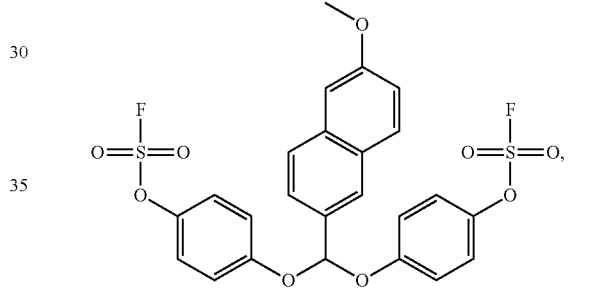
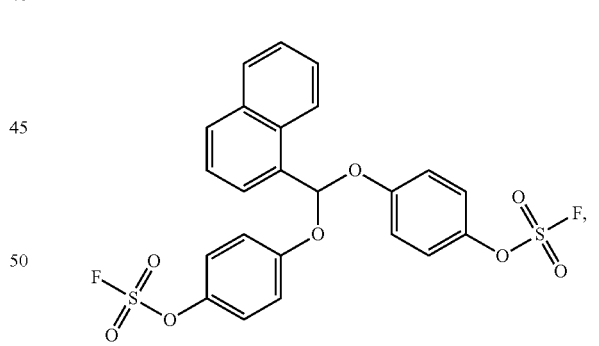
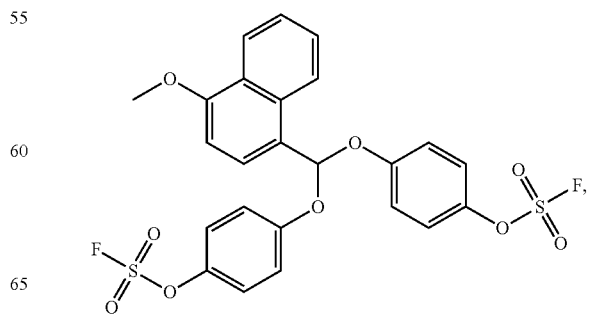

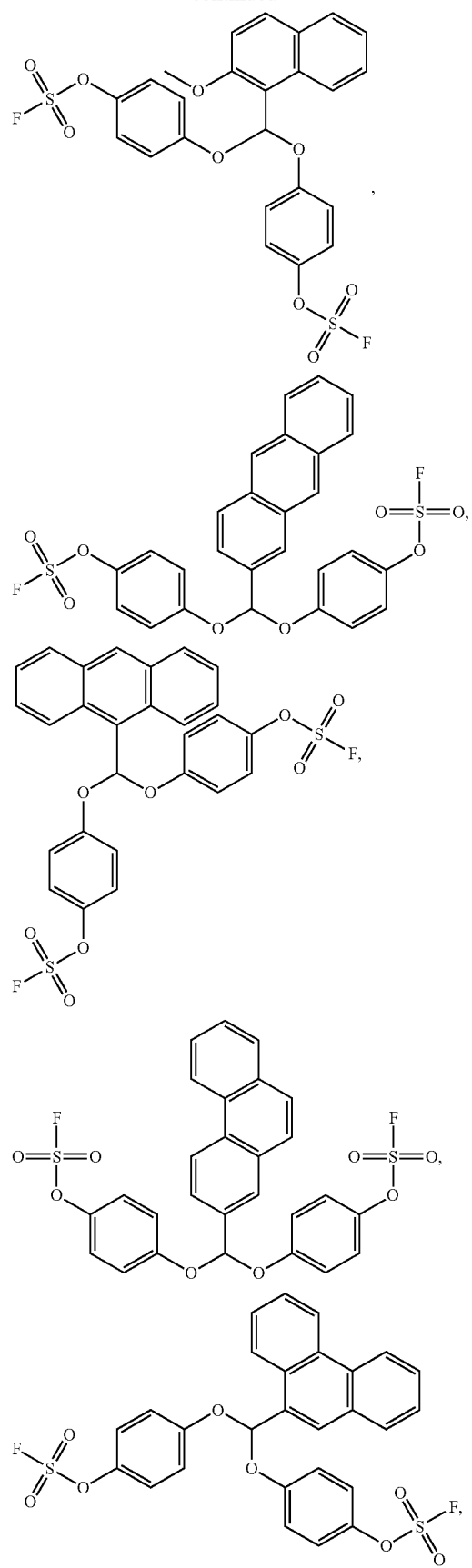
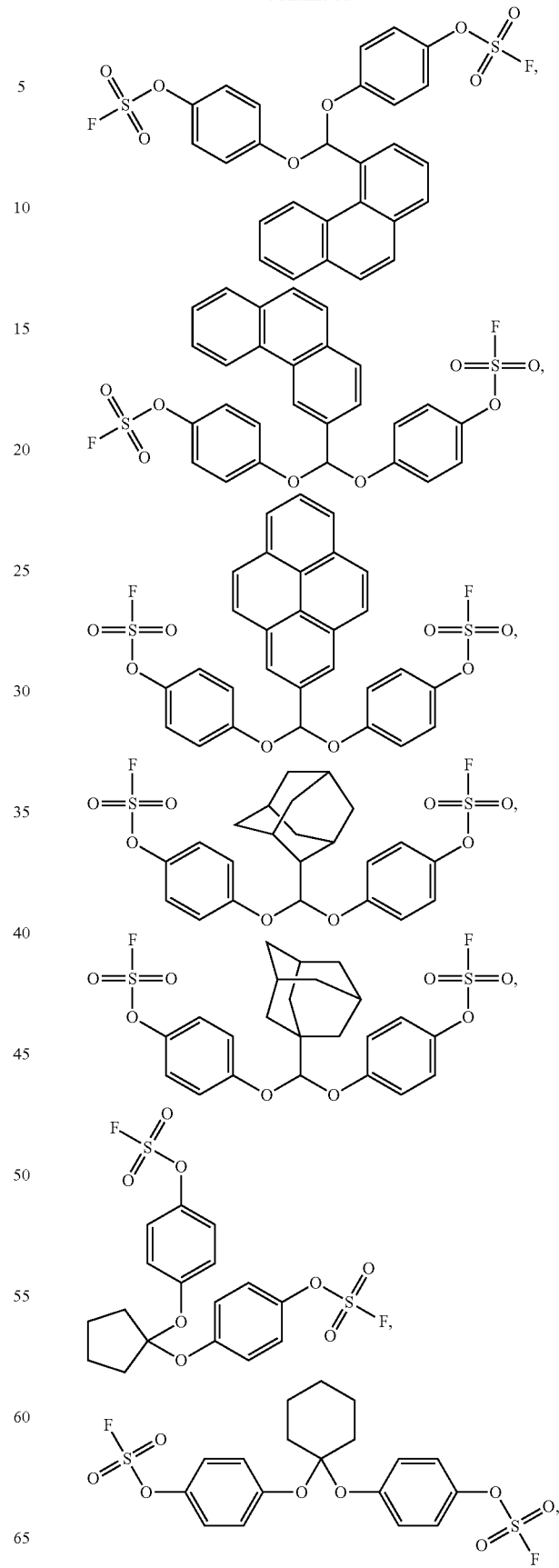

-continued
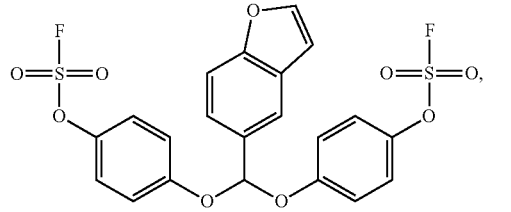
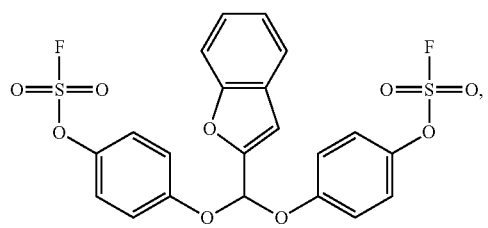
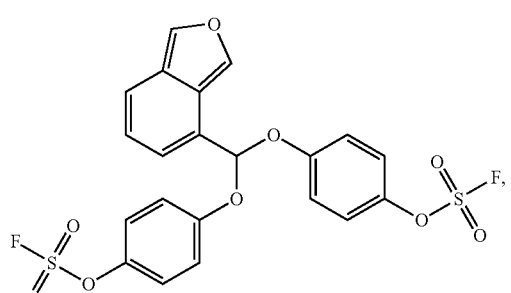
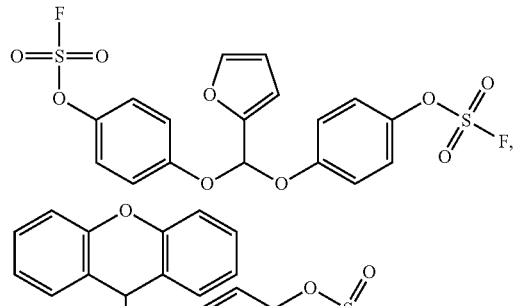
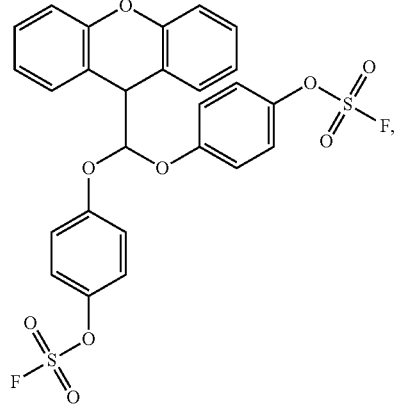
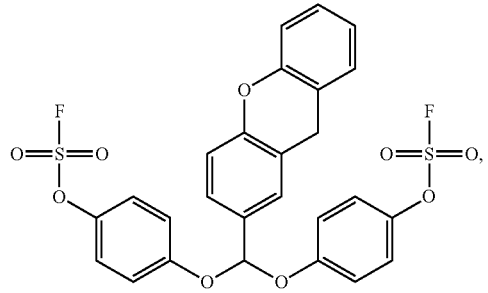
-continued
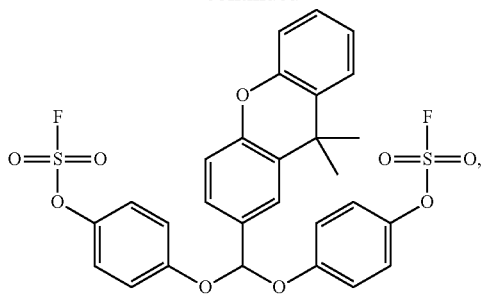
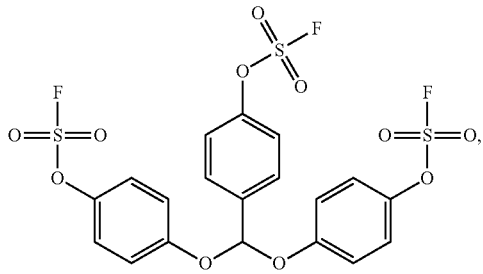
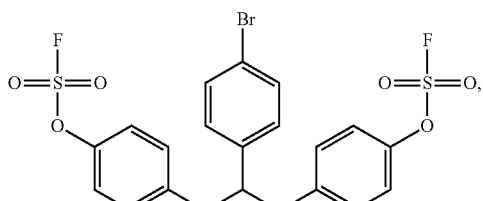
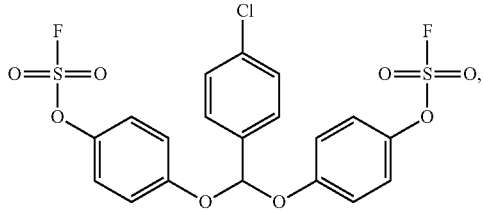
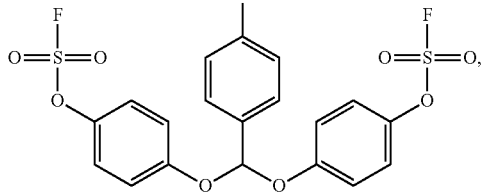
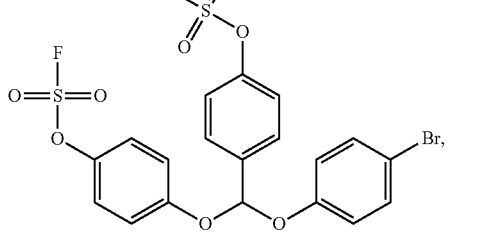
and combinations thereof.
In other very specific embodiments, the monomer comprises the first monomer having structure (1), and the first monomer having structure (1) is selected from the group consisting of

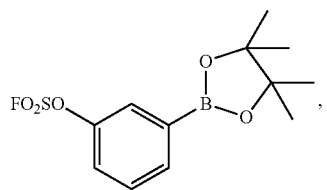
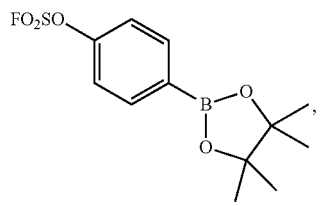
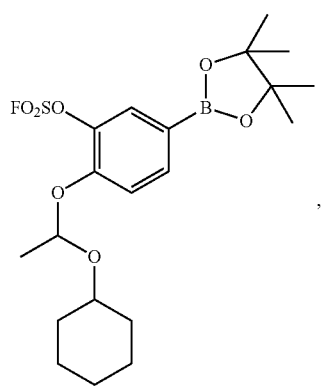
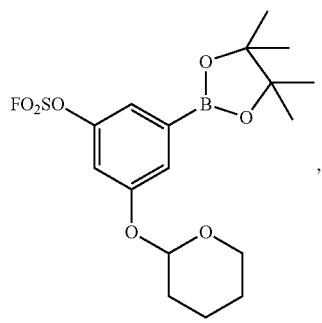
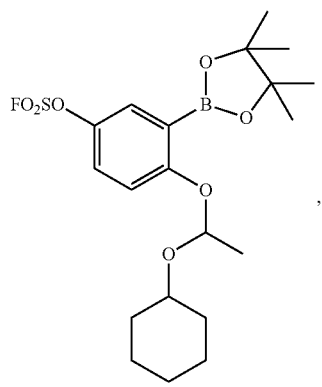
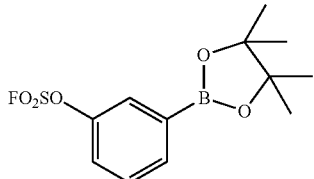
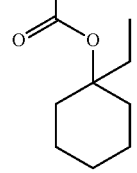
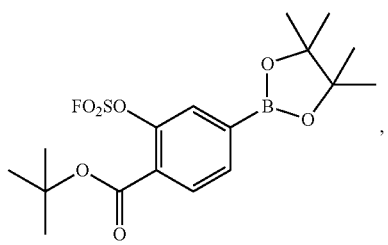
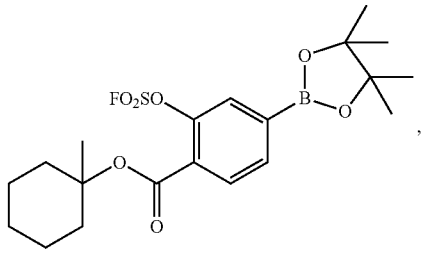
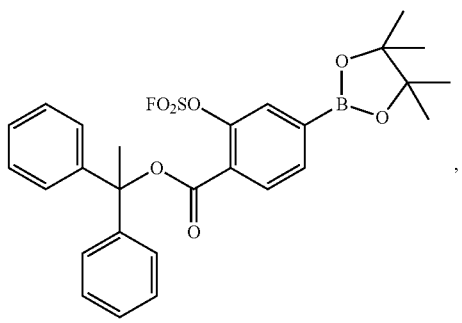
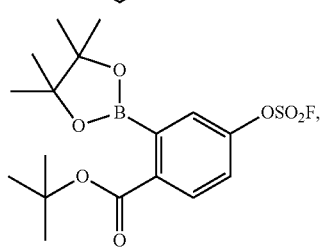
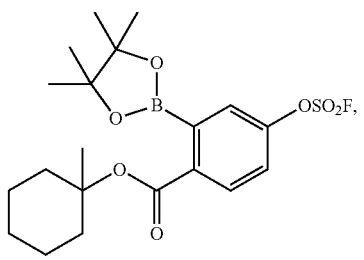

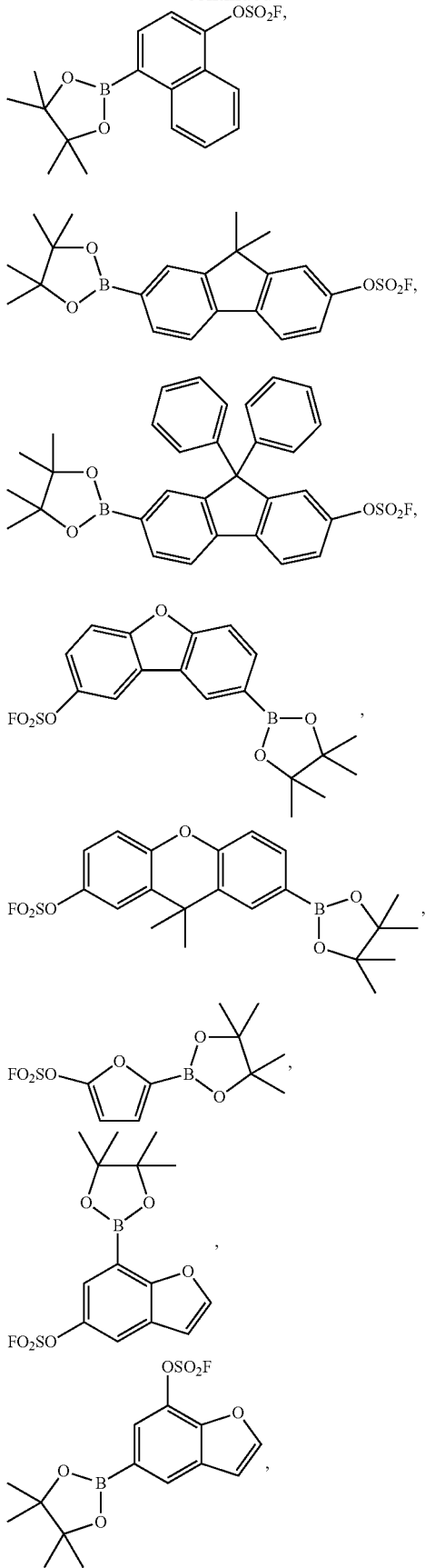
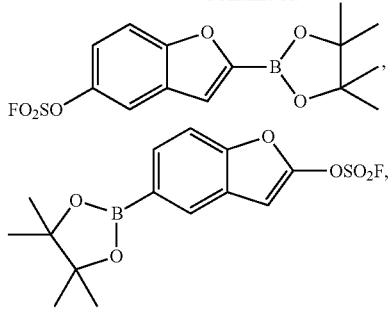
and combinations thereof, or the monomer comprises the first comonomer having structure (2) and the second comonomer having structure (3), and the first comonomer having structure (2) is selected from the group consisting of
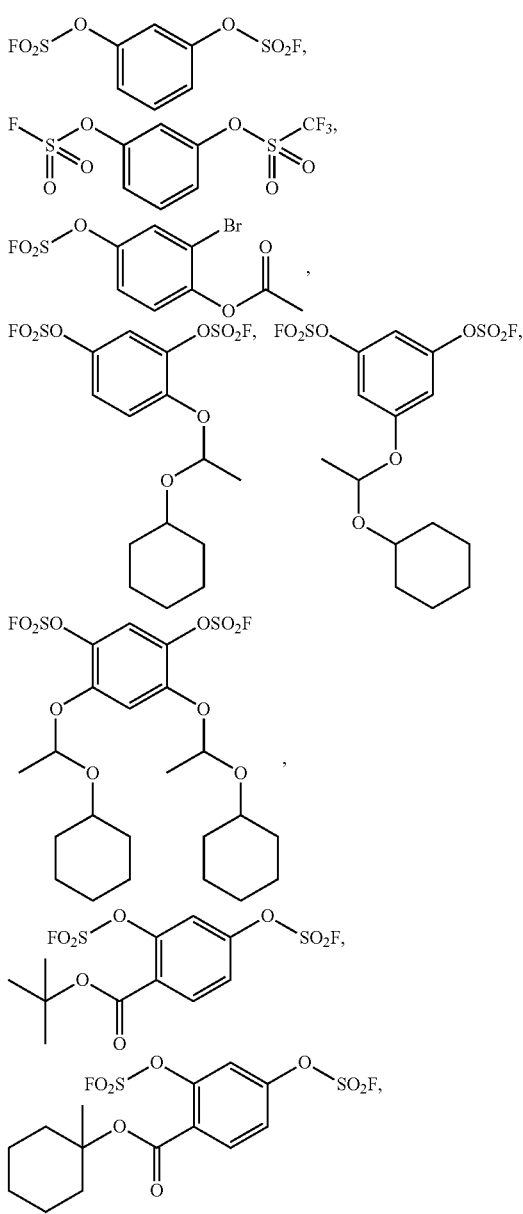

-continued
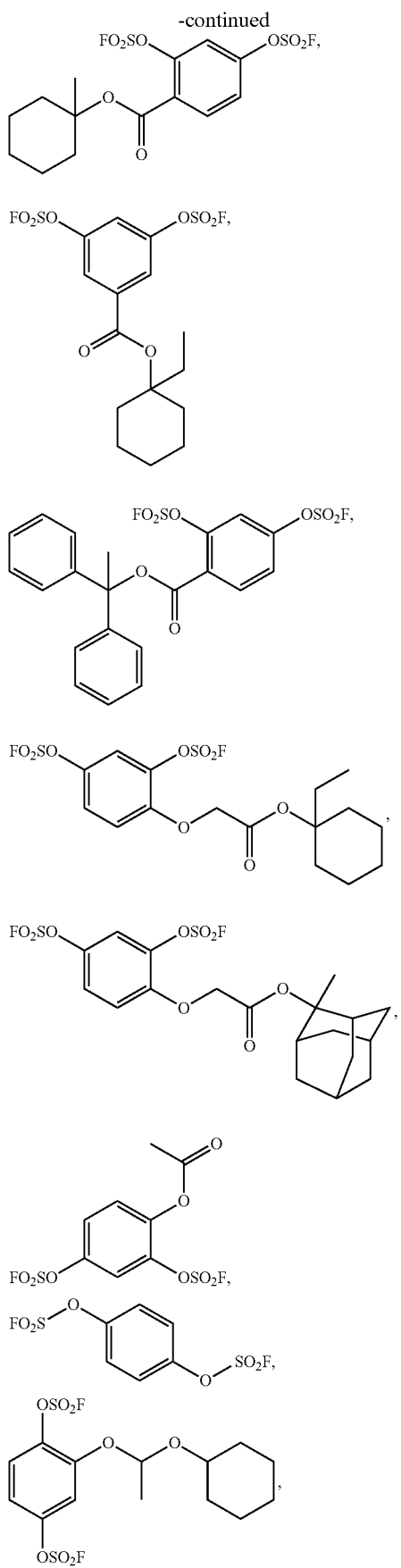 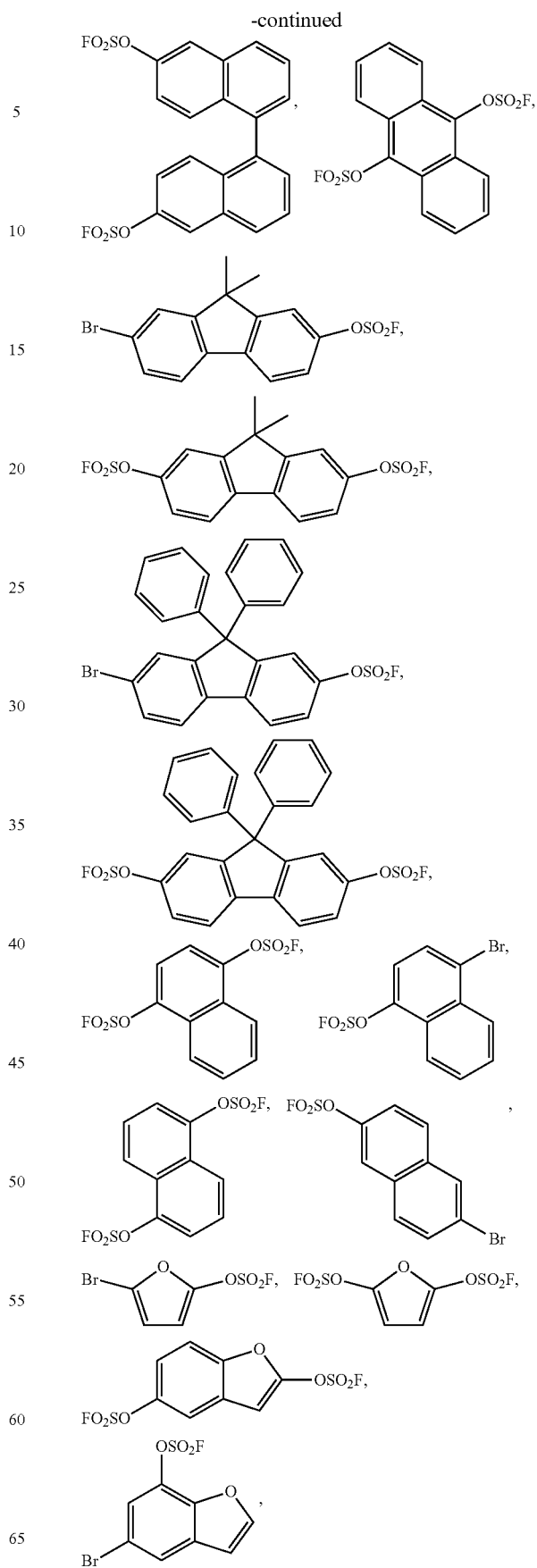

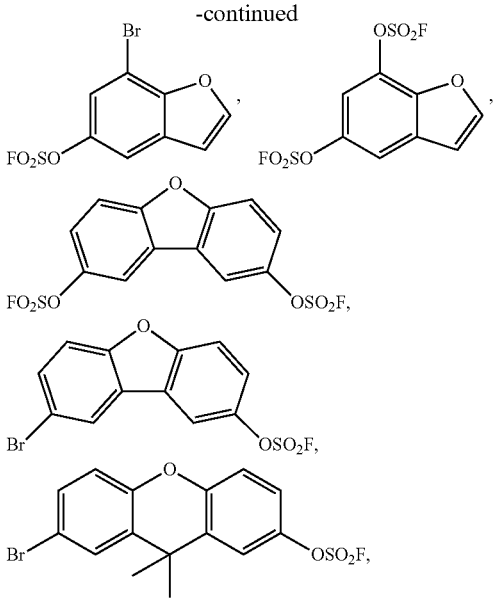

and combinations thereof.

Monomer synthesis is described in co-filed U.S. patent application Ser. No. 14/825,661.

In the method, the monomer is reacted in the presence of a catalyst and a base to form the polymer. The catalyst comprises a group 10 atom. In some instances, the reaction mixture also includes a ligand, and a base. The group 10 atoms include nickel, palladium and platinum. The catalyst having at least one group 10 atom is preferably generated in situ from one or more precatalysts and one or more ligands. Examples of palladium precatalysts include palladium(II) acetate, palladium(II) chloride, dichlorobis(acetonitrile)palladium(II), dichlorobis(benzonitrile)palladium(II), allylpalladium chloride dimer, palladium(II) acetylacetonate, palladium(II) bromide, bis(dibenzylideneacetone)palladium(0), bis(2-methylallyl)palladium chloride dimer, crotylpalladium chloride dimer, dichloro(1,5-cyclooctadiene)palladium(II), dichloro(norbornadiene)palladium(II), palladium(II) trifluoroacetate, palladium(II) benzoate, palladium(II) trimethylacetate, palladium(II) oxide, palladium(II) cyanide, tris (dibenzylideneacetone)dipalladium(0), palladium(II) hexafluoroacetylacetonate, cis-dichloro(N,N,N',N'-tetramethylethylenediamine)palladium(II), and cyclopentadienyl [(1,2,3-n)-1-phenyl-2-propenyl]palladium(II). In other embodiments, nickel-based and catalysts are used. In still other embodiments, platinum-based catalysts and precatalysts are used.

In some embodiments, pyridine-enhanced precatalyst preparation stabilization and initiation (PEPPSI) type catalysts are used, for example, [1,3-bis(2,6-diisopropylphenyl) imidazol-2-ylidene](3-chloropyridyl)palladium(II) dichloride, and (1,3-Bis(2,6-diisopropylpheny)imidazolidene)(3-chloropyridyl)palladium(II) dichloride.

The ligand used in the reaction mixture is preferably selected to generate the catalyst from the selected precatalyst. For example, the ligand may be a phosphine ligand, a carbene ligand, an amine-based ligand, an aminophosphine-based ligand, or an N-heterocyclic carbene-based ligand.

Suitable phosphine ligands include mono- and bi-dentate phosphines containing functionalized aryl or alkyl substituents. For example, suitable phosphine ligands include triphenylphosphine; tri(o-tolyl)phosphine; tris(4-methoxyphenyl)phosphine; tris(pentafluorophenyl)phosphine; tri(p-tolyl)phosphine; tri(2-furyl)phosphine; tris(4-chlorophenyl) phosphine; di(1-adamantyl)(1-naphthoyl)phosphine; benzyldiphenylphosphine; 1,1'-bis(di-t-butylphosphino)ferrocene; (−)-1,2-bis((2R,5R)-2,5-dimethylphospholano)benzene; (−)-2,3-bis[(2R,5R)-2,5-dimethylphospholanyl]-1-[3, 5-bis(trifluoromethyl)phenyl]-1H-pyrrole-2,5-dione; 1,2-bis (diphenylphosphino)benzene; 2,2'-bis(diphenylphosphino)-1,1'-binaphthyl; 2,2'-bis(diphenylphosphino)-1,1'-biphenyl, 1,4-bis(diphenylphosphino)butane; 1,2-bis(diphenylphosphino)ethane; 2-[bis(diphenylphosphino)methyl]pyridine; 1,5-bis(diphenylphosphino)pentane; 1,3-bis(diphenylphosphino)propane; 1,1'-bis(di-i-propylphosphino)ferrocene; (S)-(−)-5,5'-bis[di(3,5-xylyl)phosphino]-4,4'-bi-1,3-benzodioxole; tricyclohexylphosphine; N-[2-(di-1-adamantylphosphino)phenyl]morpholine; 2-(di-t-butylphosphino)biphenyl; 2-(di-t-butylphosphino)-3,6-dimethoxy-2',4',6'-tri-i-propyl-1,1'-biphenyl; 2-di-t-butylphosphino-2'-(N,N-dimethylamino)biphenyl; 2-di-t-butylphosphino-2'-methylbiphenyl; dicyclohexylphenylphosphine; 2-(dicyclohexylphosphino)-3,6-dimethoxy-2',4',6'-tri-i-propyl-1,1'-biphenyl; 2-(dicyclohexylphosphino)-2'-(N,N-dimethylamino)biphenyl; 2-dicyclohexylphosphino-2',6'-dimethylamino-1,1'-biphenyl; 2-dicyclohexylphosphino-2',6'-di-i-propoxy-1,1'-biphenyl; 2-dicyclohexylphosphino-2'-methylbiphenyl; 2-[2-(dicyclohexylphosphino)phenyl]-1-methyl-1H-indole; 2-(dicyclohexylphosphino)-2',4',6'-tri-i-propyl-1,1'-biphenyl; [4-(N,N-dimethylamino)phenyl]di-t-butylphosphine; 9,9-dimethyl-4,5-bis(diphenylphosphino) xanthene; (R)-(−)-1-[(S)-2-(diphenylphosphino)ferrocenyl] ethyldicyclohexylphosphine; tribenzylphosphine; tri-t-butylphosphine; tri-n-butylphosphine; and 1,1'-bis (diphenylphosphino)ferrocene.

Suitable amine and aminophosphine-based ligands include any combination of monodentate or bidentate alkyl and aromatic amines including pyridine, 2,2'-bipyridyl, 4,4'-dimethyl-2,2'-dipyridyl, 1,10-phenanthroline, 3,4,7,8-tetramethyl-1,10-phenanthroline, 4,7-dimethoxy-1,10-phenanthroline, N,N,N',N'-tetramethylethylenediamine, 1,3-diaminopropane, ammonia, 4-(aminomethyl)pyridine, (1R, 2S,9S)-(+)-11-methyl-7,11-diazatricyclo[7.3.1.0$^{2,7}$] tridecane, 2,6-di-tert-butylpyridine, 2,2'-bis[(4S)-4-benzyl-2-oxazoline], 2,2-bis((4S)-(−)-4-isopropyloxazoline) propane, 2,2'-methylenebis[(4S)-4-phenyl-2-oxazoline], and 4,4'-di-tert-butyl-2,2'bipyridyl. In addition, aminophosphine ligands such as 2-(diphenylphosphino)ethylamine, 2-(2-(diphenylphosphino)ethyl)pyridine, (1R,2R)-2-(diphenylphosphino)cyclohexanamine, and 2-(di-tert-butylphosphino)ethylamine can be used.

Suitable carbene ligands include N-heterocyclic carbene (NHC) based ligands, including 1,3-bis(2,4,6-trimethylphenyl)imidazolinium chloride, 1,3-bis(2,6-diisopropylphenyl) imidazolium chloride, 1,3-bis-(2,6-diisopropylphenyl)imidazolinium chloride, 1,3-diisopropylimidazolium chloride, and 1,3-dicyclohexylbenzimidazolium chloride.

In some embodiments, the catalyst or a pre-catalyst thereof has structure (8)

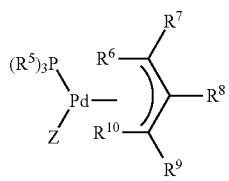

(8)

wherein each occurrence of $R^5$ is independently unsubstituted or substituted $C_{1-12}$ linear or branched alkyl, unsubstituted or substituted $C_{3-12}$ cycloalkyl, unsubstituted or substituted $C_{6-12}$ aryl, or unsubstituted or substituted ferrocenyl; $R^6$, $R^7$, $R^8$, $R^9$, and $R^{10}$, are each independently hydrogen, $C_{1-6}$ linear or branched alkyl, $C_{3-6}$ cycloalkyl, or phenyl; and Z is selected from the group consisting of fluoro, chloro, bromo, iodo, cyano (—CN), cyanato (—OCN), isocyanato (—NCO), thiocyanato (—SCN), isothiocyanato (—NCS), nitro (—NO$_2$), nitrito (—ON=O), azido (—N=N$^+$=N$^-$), and hydroxyl.

The base used in the reaction mixture is selected to be compatible with the catalyst, the boron-containing group, and the halosulfonate. Suitable bases include, but are not limited to, carbonate salts, phosphate salts, acetate salts and carboxylic acid salts.

Examples of carbonate salts include lithium carbonate, sodium carbonate, potassium carbonate, rubidium carbonate, cesium carbonate, ammonium carbonate, substituted ammonium carbonates, the corresponding hydrogen carbonate salts, and combinations of the foregoing salts.

Examples of phosphate salts include, but are not limited to, lithium phosphate, sodium phosphate, potassium phosphate, rubidium phosphate, cesium phosphate, ammonium phosphate, substituted ammonium phosphates, corresponding hydrogen phosphate salts, and combinations of the foregoing salts.

Examples of acetate salts include lithium acetate, sodium acetate, potassium acetate, rubidium acetate, cesium acetate, ammonium acetate, substituted ammonium acetates, and combinations of the foregoing salts.

Other bases include salts of formate, fluoroacetate, and propionate anions with lithium, sodium, potassium, rubidium, cesium, ammonium, and substituted ammonium cations; metal hydroxides, such as lithium hydroxide, sodium hydroxide, potassium hydroxide; metal dihydroxides such as magnesium dihydroxide, calcium dihydroxide, strontium dihydroxide, and barium dihydroxide; metal trihydroxides such as aluminum trihydroxide, gallium trihydroxide, indium trihydroxide, thallium trihydroxide; non-nucleophilic organic amines such as triethylamine, N,N-diisopropylethylamine, 1,4-diazabicyclo[2.2.2]octane (DABCO), 1,5-Diazabicyclo[4.3.0]non-5-ene (DBN), 1,8-Diazabicyclo[5.4.0]undec-7-ene (DBU); bis(silyl)amide salts such as the lithium, sodium, and potassium salts of bis(trimethylsilyl)amide; alkoxide salts such as the lithium, sodium, and potassium salts oft butoxide; and 1,8-bis(dimethylamino)naphthalene; metal fluorides, such as sodium fluoride, potassium fluoride, cesium fluoride, silver fluoride, tetra butyl ammonium fluoride, ammonium fluoride, triethyl ammonium fluoride; and combinations of the foregoing.

Examples of amine bases, such as alkylamines and heteroarenes include triethylamine, pyridine, morpholine, 2,6-lutidine, triethylamine, N,N-dicyclohexylmethylamine, diisopropylamine, and combinations thereof.

In some embodiments, the base is used in the presence of a phase-transfer catalyst. In some embodiments, the base is used in the presence of water. In some embodiments, the base is used in the presence of an organic solvent. In some embodiments, the base is used in the presence of two or more of a phase-transfer catalyst, water, and an organic solvent.

In some embodiments, the base is selected from the group consisting of lithium carbonate, sodium carbonate, potassium carbonate, rubidium carbonate, cesium carbonate, ammonium carbonate, substituted ammonium carbonates, hydrogen carbonates, lithium phosphate, sodium phosphate, potassium phosphate, rubidium phosphate, cesium phosphate, ammonium phosphate, substituted ammonium phosphates, hydrogen phosphates, lithium acetate, sodium acetate, potassium acetate, rubidium acetate, cesium acetate, ammonium acetate, substituted ammonium acetates, formate salts, fluoroacetate salts, propionate anions with lithium, sodium, potassium, rubidium, cesium, ammonium, and substituted ammonium cations, lithium hydroxide, sodium hydroxide, potassium hydroxide, magnesium dihydroxide, calcium dihydroxide, strontium dihydroxide, and barium dihydroxide, aluminum trihydroxide, gallium trihydroxide, indium trihydroxide, thallium trihydroxide, triethylamine, N,N-diisopropylethylamine, 1,4-diazabicyclo[2.2.2]octane, 1,5-diazabicyclo[4.3.0]non-5-ene, 1,8-diazabicyclo[5.4.0]undec-7-ene, lithium, sodium, and potassium salts of bis(trimethylsilyl)amide, lithium, sodium, and potassium salts of t-butoxide, 1,8-bis(dimethylamino)naphthalene, pyridine, morpholine, 2,6-lutidine, triethylamine, N,N-dicyclohexylmethylamine, diisopropylamine, sodium fluoride, potassium fluoride, cesium fluoride, silver fluoride, tetra butyl ammonium fluoride, ammonium fluoride, triethyl ammonium fluoride, and combinations thereof.

Preferably, at least one equivalent of base is present for each equivalent of halosulfonate. In some embodiments, no more than 10 equivalents of base are present for each equivalent of halosulfonate. In some embodiments, at least 2 equivalents of base are present for each equivalent of halosulfonate. In some embodiments, no more than 6 equivalents of base are present for each equivalent of halosulfonate.

The solvent in the reaction mixture is selected such that it is suitable for use with the reactants, the catalyst, the ligand, and the base. For example, suitable solvents include toluene, xylenes (ortho-xylene, meta-xylene, para-xylene or mixtures thereof), benzene, water, methanol, ethanol, 1-propanol, 2-propanol, n-butanol, 2-butanol, pentanol, hexanol, tert-butyl alcohol, tert-amyl alcohol, ethylene glycol, 1,2-propanedioal, 1,3-propanediol, glycerol, N-methyl-2-pyrrolidone, acetonitrile, N,N-dimethylformamide, methyl acetate, ethyl acetate, propyl acetate, isopropyl acetate, triacetin, acetone, methyl ethyl ketone, and ethereal solvents, such as 1,4-dioxane, tetrahydrofuran, 2-methyltetrahydrofuran, diethylether, cyclopenyl methyl ether, 2-butyl ethyl ether, dimethoxyethane, polyethyleneglycol and combinations thereof. In some embodiments in which the halosulfonate is fluorosulfonate, sulfuryl fluoride is used neat at a sufficiently low temperature that the sulfuryl fluoride is a liquid.

In some embodiments, water is included in the reaction mixture. One benefit of using fluorosulfonates as compared to triflates, is that the reaction can be carried out without a subsequent separation step, or with a simple separation step. In Suzuki couplings involving triflates, a dedicated purification step is required to remove byproducts since the products and the byproducts typically occupy the same phase. In the reaction schemes described herein, the byproducts are either in the gas phase, and will bubble out spontaneously or with a simple degassing step, or will partition into the aqueous phase, which is easily separable. As such, the reaction scheme described herein provides additional benefits as compared to Suzuki couplings involving triflates.

EXAMPLES

Synthesis of Polymer 1

This example illustrates homopolymerization of a single monomer. FIG. 1 is a chemical scheme for the synthesis of Polymer 1. Polymer 1, shown in FIG. 1, is synthesized by the following prophetic procedure. Inside a nitrogen-purged glovebox, to a 30 milliliter vial is added 4-((4-(4,4,5,5-tetramethyl-1,3,2-dioxaborolan-2-yl)phenoxy)methoxy)phenyl sulfurofluoridate (500 milligrams, 1 millimole, 1 equivalent) and 1,4-dioxane (3 milliliters). Potassium phosphate (637 milligrams, 3 millimoles, 3 equivalents) is dissolved in water (637 microliters) and added to the vial. The mixture is vigorously stirred until both phases are well-blended after which a catalyst solution of Pd(crotyl)(P(tBu)$_3$) (0.4 milligram, 1 micromole, 0.001 equivalent) dissolved in 1,4-dioxane (100 microliters) is added. The reaction is vigorously stirred overnight, optionally with mild heating. The obtained polymer is optionally end-capped by adding phenyl boronic acid (18 milligrams, 0.15 millimole, 0.15 equivalent), followed by stirring for another 18-24 hours, addition of bromobenzene (47 milligrams, 0.3 millimoles, 0.3 equivalents) and another period of stirring for 18-24 hours.

The reaction mixture is worked up by adding 5 milliliters of brine and 15-30 milliliters of ethyl acetate followed by shaking in an extraction funnel. The aqueous layer is removed and the remaining organic phase is further washed with brine (1×5 milliliters). In order to remove trace palladium and salts, the organic phase is optionally further transferred into a round bottom flask equipped with reflux condenser. A saturated aqueous solution of diethyldithiocarbamate (0.5-1.0 milliliter) is added and the mixture is vigorously stirred and heated to reflux. The organic phase is phase separated, dried over magnesium sulfate and filtered through a two-layered plug of neutral alumina and silica gel. The crude product is fully eluted with 20-30 mL of additional ethyl acetate and the combined organic phases are washed with deionized water (5×5 milliliters) and concentrated on the rotary evaporator. The residue is redissolved in ethyl acetate (~5 milliliters) and toluene (0.5-1 milliliters). The polymer is precipitated by drop-wise addition to stirred methanol. Once the addition is completed, the suspension is stirred for 30 minutes and then allowed to settle. The precipitate is collected by filtration. Optionally, the precipitate can be redissolved in ethyl acetate/toluene and the precipitation from methanol repeated twice more. After the final precipitation, the filter cake is dried under high vacuum at approximately 65° C.

Synthesis of Polymer 2

Figure 2:
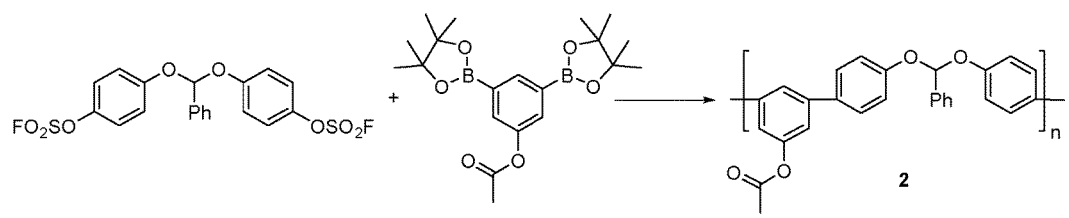
FIG. 2 is a chemical scheme for copolymerization of a first comonomer with two fluorosulfonyl groups and a second comonomer with two dioxaborolanyl groups.

This example illustrates copolymerization of a first comonomer with two fluorosulfonyl groups and a second comonomer with two dioxaborolanyl groups. FIG. 2 is a chemical scheme for the synthesis of Polymer 2. Polymer 2, shown in FIG. 2, is synthesized by the following prophetic procedure. Inside a nitrogen-purged glovebox, to a 30 milliliter vial is added ((phenylmethylene)bis(oxy))bis(4,1-phenylene) bis(sulfurofluoridate) (472 milligrams, 1 millimole, 1 equivalent), 3,5-bis(4,4,5,5-tetramethyl-1,3,2-dioxaborolan-2-yl)phenyl acetate (388 milligrams, 1 millimole, 1 equivalent) and 1,4-dioxane (3 milliliters). Potassium phosphate (637 milligrams, 3 millimoles, 3 equivalents) is dissolved in water (637 microliters) and added to the vial. The mixture is vigorously stirred until both phases are well-blended after which catalyst solution of Pd(crotyl)(P(tBu)$_3$) (0.4 milligram, 1 micromole, 0.001 equivalent) dissolved in 1,4-dioxane (100 microliters) is added. The reaction is vigorously stirred overnight, optionally with mild heating. The obtained polymer is optionally end-capped by adding phenyl boronic acid (18 milligrams, 0.15 millimole, 0.15 equivalent), followed by stirring for another 18-24 hours, addition of bromobenzene (47 milligrams, 0.3 millimole, 0.3 equivalent) and another period of stirring for 18-24 hours. Workup is performed as outlined for Polymer 1.

Synthesis of Polymer 3

Figure 3:
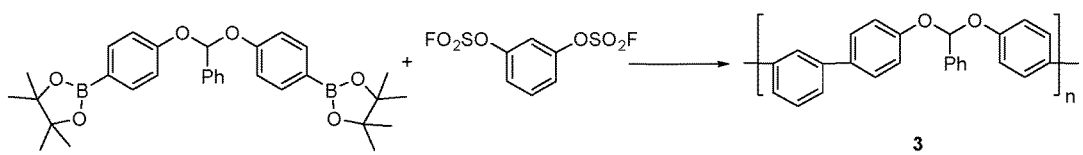
FIG. 3 is a chemical scheme for another copolymerization of a first comonomer with two fluorosulfonyl groups and a second comonomer with two dioxaborolanyl groups.

This example provides another illustration of copolymerization of a first comonomer with two fluorosulfonyl groups and a second comonomer with two dioxaborolanyl groups. FIG. 3 is a chemical scheme for the synthesis of Polymer 3. Polymer 3, shown in FIG. 3, is synthesized by the following prophetic procedure. Inside a nitrogen-purged glovebox, to a 30 milliliter vial is added 2,2'-(((phenylmethylene)bis(oxy))bis(4,1-phenylene))bis(4,4,5,5-tetramethyl-1,3,2-dioxaborolane) (528 milligrams, 1 millimole, 1 equivalent), 1,3-phenylene bis(sulfurofluoridate) (274 milligrams, 1 millimole, 1 equivalent) and 1,4-dioxane (3 milliliters). Potassium phosphate (637 milligrams, 3 millimoles, 3 equivalents) is dissolved in water (637 microliters) and added to the vial. The mixture is vigorously stirred until both phases are well-blended after which catalyst solution of Pd(crotyl)(P(tBu)$_3$) (0.4 milligram, 1 micromole, 0.001 equivalent) dissolved in 1,4-dioxane (100 microliters) is added. The reaction is vigorously stirred overnight, optionally with mild heating. The obtained polymer is optionally end-capped by adding phenyl boronic acid (18 milligrams, 0.15 millimole, 0.15 equivalent), followed by stirring for another 18-24 hours, addition of bromobenzene (47 milligrams, 0.3 millimole, 0.3 equivalent) and another period of stirring for 18-24 hours. Workup is performed as outlined for Polymer 1.

Synthesis of Polymer 4

Figure 4:
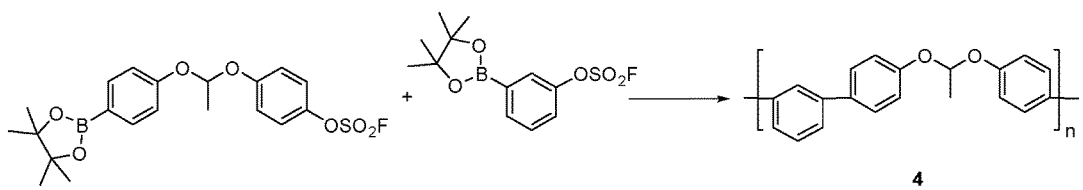
FIG. 4 is a chemical scheme for copolymerization of a two monomers, each having a fluorosulfonyl group and a dioxaborolanyl group.

This example illustrates copolymerization of a two monomers, each having a fluorosulfonyl group and a dioxaborolanyl group. FIG. 4 is a chemical scheme for the synthesis of Polymer 4. Polymer 4, shown in FIG. 4, is synthesized by the following prophetic procedure. Inside a nitrogen-purged glovebox, to a 30 milliliter vial is added 4-(1-(4-(4,4,5,5-tetramethyl-1,3,2-dioxaborolan-2-yl)phenoxy)ethoxy)phenyl sulfurofluoridate (428 milligrams, 1 millimole, 1 equivalent), 3-(4,4,5,5-tetramethyl-1,3,2-dioxaborolan-2-yl) phenyl sulfurofluoridate (302 milligrams, 1 millimole, 1 equivalent) and 1,4-dioxane (3 milliliters). Potassium phosphate (637 milligrams, 3 millimoles, 3 equivalents) is dissolved in water (637 microliters) and added to the vial. The mixture is vigorously stirred until both phases are well-blended after which catalyst solution of Pd(crotyl)(P(tBu)$_3$) (0.4 milligram, 1 micromole, 0.001 equivalent) dissolved in 1,4-dioxane (100 microliters) is added. The reaction is vigorously stirred overnight, optionally with mild heating. The obtained polymer is optionally end-capped by adding phenyl boronic acid (18 milligrams, 0.15 millimole, 0.15 equivalent), followed by stirring for another 18-24 hours, addition of bromobenzene (47 milligrams, 0.3 millimole, 0.3 equivalent) and another period of stirring for 18-24 hours. Workup is performed as outlined for Polymer 1.

Synthesis of Polymer 5

Figure 5:
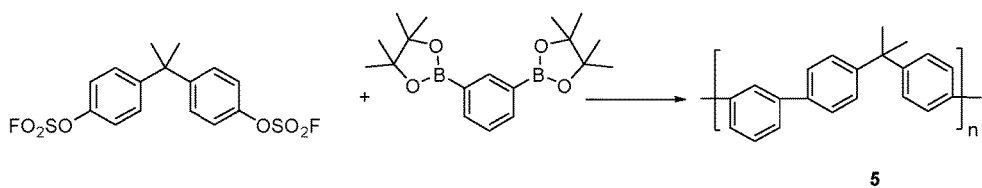
FIG. 5 is a chemical scheme for copolymerization of a first comonomer with two fluorosulfonyl groups and a second comonomer with two dioxaborolanyl groups, wherein neither monomer comprises a ketal or other acid-sensitive group.

This example illustrates copolymerization of a first comonomer with two fluorosulfonyl groups and a second comonomer with two dioxaborolanyl groups. In this example, neither monomer comprises a ketal or other acid-sensitive group. FIG. 5 is a chemical scheme for the synthesis of Polymer 5. Polymer 5, shown in FIG. 5, is synthesized by the following prophetic procedure. Inside a nitrogen-purged glovebox, to a 30 milliliter vial is added propane-2,2-diylbis(4,1-phenylene) bis(sulfurofluoridate) (392 milligrams, 1 millimole, 1 equivalent), 1,3-bis(4,4,5,5-tetramethyl-1,3,2-dioxaborolan-2-yl)benzene (330 milligrams, 1 millimole, 1 equivalent) and 1,4-dioxane (3 milliliter). Potassium phosphate (637 milligrams, 3 millimoles, 3 equivalents) is dissolved in water (637 microliters) and added to the vial. The mixture is vigorously stirred until both phases are well-blended, after which catalyst solution of Pd(crotyl)(P(tBu)$_3$) (0.4 milligram, 1 micromole, 0.001 equivalent) dissolved in 1,4-dioxane (100 microliters) is added. The reaction is vigorously stirred overnight, optionally with mild heating. The obtained polymer is optionally end-capped by adding phenyl boronic acid (18 milligrams, 0.15 millimole, 0.15 equivalent), followed by stirring for another 18-24 hours, addition of bromobenzene (47 milligrams, 0.3 millimole, 0.3 equivalent) and another period of stirring for 18-24 hours. Workup is performed as outlined for Polymer 1.

The invention claimed is:

1. A method of forming a polyaryl polymer, the method comprising: reacting a monomer in the presence of a catalyst and a base to form a polymer; wherein the monomer comprises
    (a) a first monomer having structure (1)

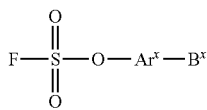
(1)

wherein
$Ar^x$ is unsubstituted or substituted $C_{6-43}$ arylene, or unsubstituted or substituted $C_{3-43}$ heteroarylene; and
$B^x$ is a boron-containing functional group bonded to $Ar^x$ via a boron atom; or
    (b) a first comonomer having structure (2) and a second comonomer having structure (3)

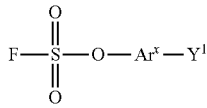
(2)

$B^x—Ar^x—B^x$ (3)

wherein
$Ar^x$ is independently at each occurrence unsubstituted or substituted $C_{6-24}$ arylene, or unsubstituted or substituted $C_{3-24}$ heteroarylene;
$Y^1$ is chloro, bromo, iodo, mesylate, tosylate, triflate, sulfonyl fluoride, sulfonyl chloride, sulfonyl bromide, or sulfonyl iodide; and
$B^x$ is independently at each occurrence a boron-containing functional group bonded to $Ar^x$ via a boron atom.

2. The method of claim 1, wherein the monomer comprises the first monomer having structure (1).

3. The method of claim 1, wherein the monomer comprises the first comonomer having structure (2) and the second comonomer having structure (3).

4. The method of claim 1, further comprising forming in situ the first monomer having structure (1) by reacting sulfuryl fluoride (S(O)$_2$F$_2$) with a first monomer precursor having structure (4)

(4)

or
further comprising forming in situ the first comonomer having structure (2) by reacting sulfuryl fluoride with a first comonomer precursor having structure (5) or structure (6)

(5)

(6)

wherein $Ar^x$ is defined as in claim 1; and $Y^2$ is chloro, bromo, iodo, mesylate, tosylate, or triflate.

5. The method of claim 1, wherein in structure (1) and structure (3) each occurrence of $B^x$ is selected from the group consisting of —BF$_3^-$M$^+$, wherein each occurrence of M$^+$ is independently an alkali metal cation, or an unsubstituted or substituted ammonium ion; —B(OH)$_2$;

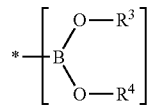

wherein R$^3$ and R$^4$ are each independently $C_{1-18}$ alkyl, $C_{3-18}$ cycloalkyl, or $C_{6-18}$ aryl; and R$^3$ and R$^4$ are optionally covalently linked to each other to form a ring that includes

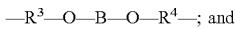
—R$^3$—O—B—O—R$^4$—; and

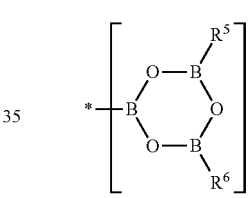

wherein R$^5$ and R$^6$ are each independently hydrogen, unsubstituted or substituted $C_{1-12}$ linear or branched alkyl, unsubstituted or substituted $C_{3-12}$ cycloalkyl, unsubstituted or substituted $C_{6-12}$ aryl, unsubstituted or substituted $C_{3-12}$ heteroaryl, or

*—[O—Ar$^x$—Z]

and wherein Z is chloro, bromo, iodo, mesylate, tosylate, triflate, or sulfonyl fluoride, or B$^z$ wherein B$^z$ is selected from the group consisting of —BF$_3^-$M$^+$, wherein each occurrence of M$^+$ is independently an alkali metal cation, or an unsubstituted or substituted ammonium ion; —B(OH)$_2$;

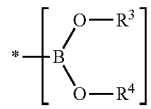

wherein R$^3$ and R$^4$ are each independently $C_{1-18}$ alkyl, $C_{3-18}$ cycloalkyl, or $C_{6-18}$ aryl; and R$^3$ and R$^4$ are optionally covalently linked to each other to form a ring that includes

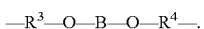
—R$^3$—O—B—O—R$^4$—.

6. The method of claim 1, wherein in structure (1) Ar$^x$ is substituted with at least one functional group selected from the group consisting of hydroxyl, acetals, ketals, esters, and lactones; and wherein in structure (2) or structure (3) or both structure (2) and structure (3), Ar$^x$ is substituted with at least one functional group selected from the group consisting of hydroxyl, acetals, ketals, esters, and lactones.

7. The method of claim 1,
wherein in structure (1) Ar$^x$ has structure (7)

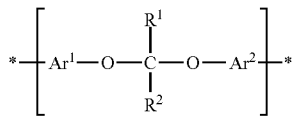
(7)

wherein Ar$^1$ and Ar$^2$ are each independently unsubstituted or substituted C$_{6-18}$ arylene, or unsubstituted or substituted C$_{3-18}$ heteroarylene, provided that the sum of carbon atoms in Ar$^1$ and Ar$^2$ is 9 to 24; and R$^3$ and R$^4$ are each independently hydrogen, unsubstituted or substituted C$_{1-18}$ linear or branched alkyl, unsubstituted or substituted C$_{3-18}$ cycloalkyl; unsubstituted or substituted C$_{6-18}$ aryl, or unsubstituted or substituted C$_{3-18}$ heteroaryl; and R$^1$ and R$^2$ are optionally covalently linked to each other to form a ring that includes.

8. The method of claim 1,
wherein the monomer comprises the first monomer having structure (1), and wherein the first monomer having structure (1) is selected from the group consisting of

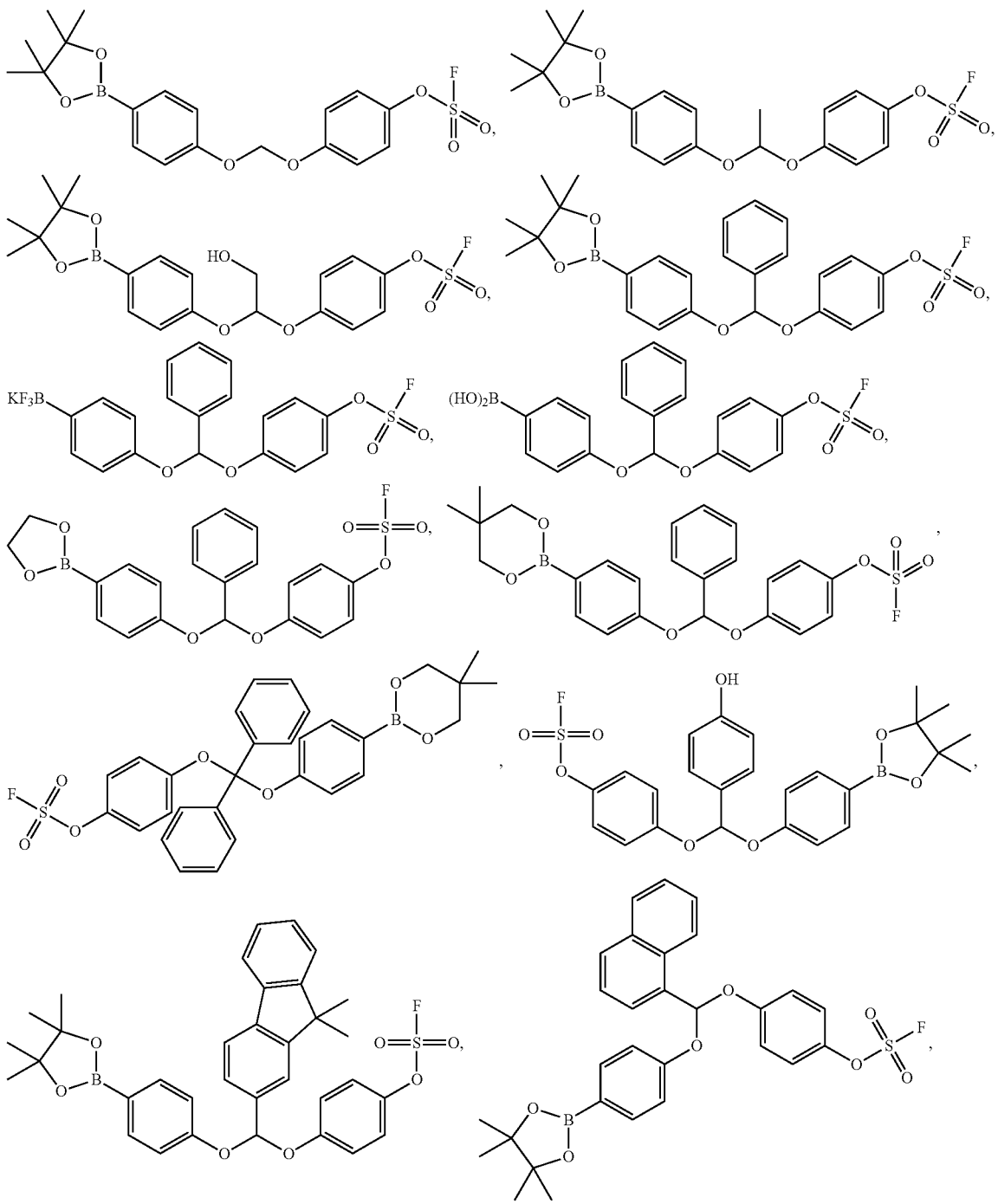

-continued
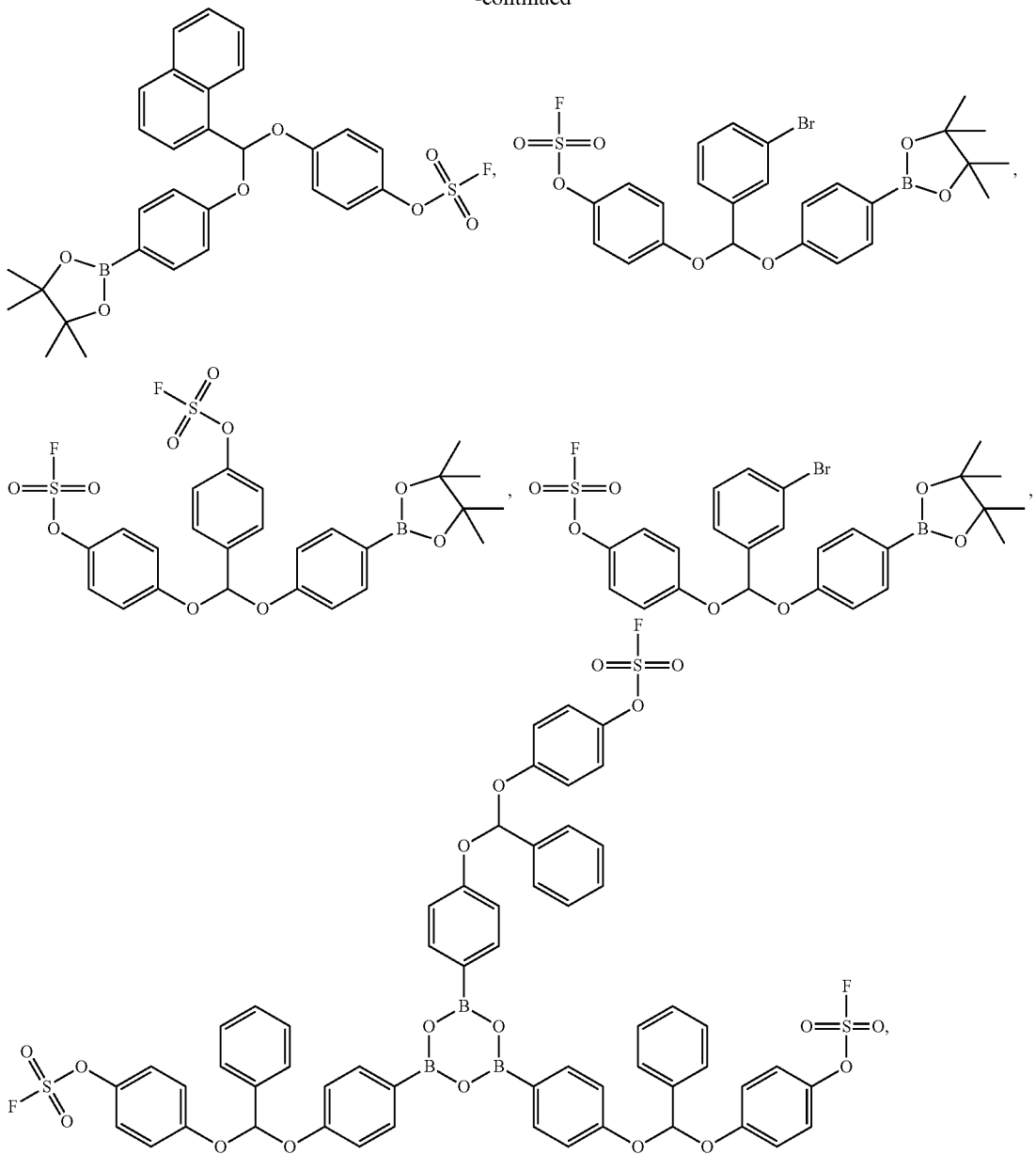
and combinations thereof; or
wherein the monomer comprises the first comonomer having structure (2) and the second comonomer having structure (3), and wherein the first comonomer having structure (2) is selected from the group consisting of
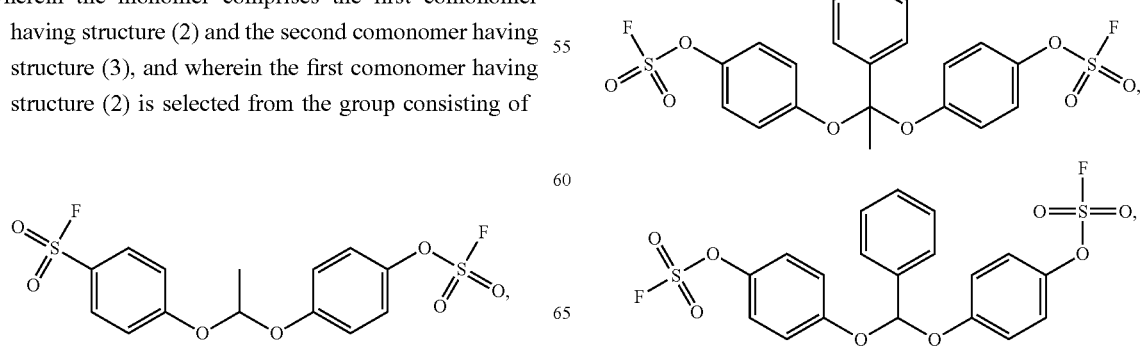

-continued
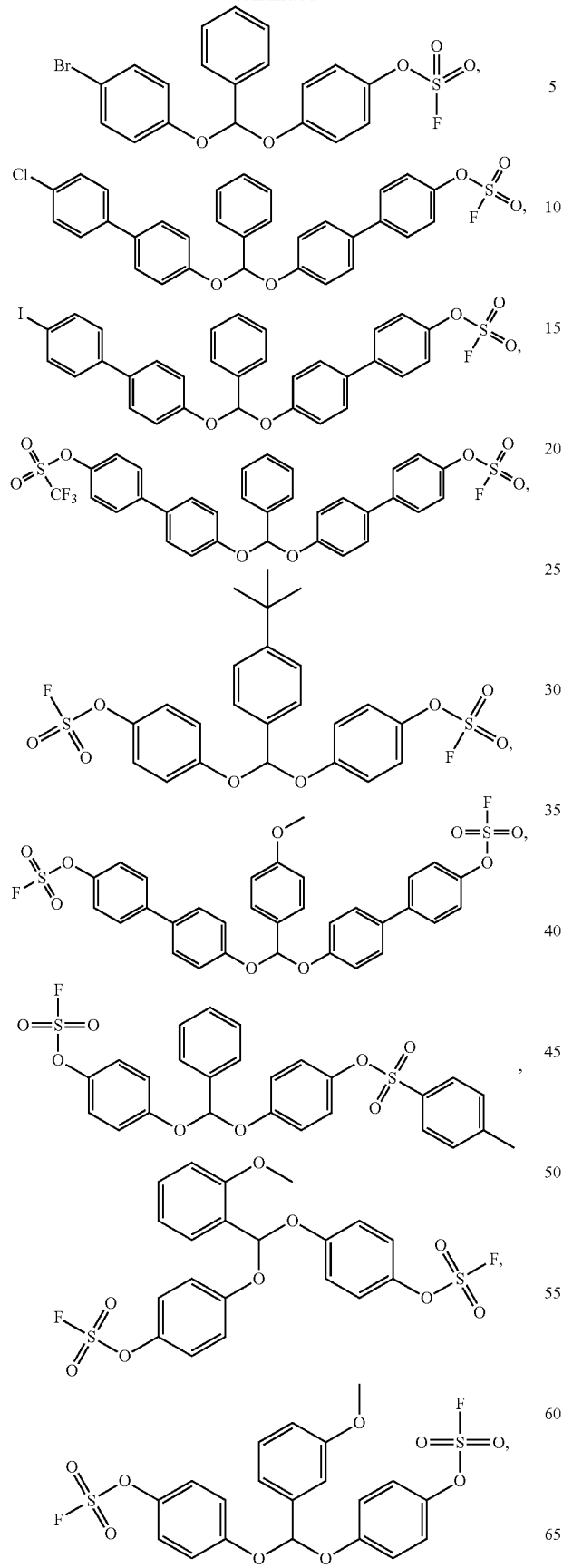
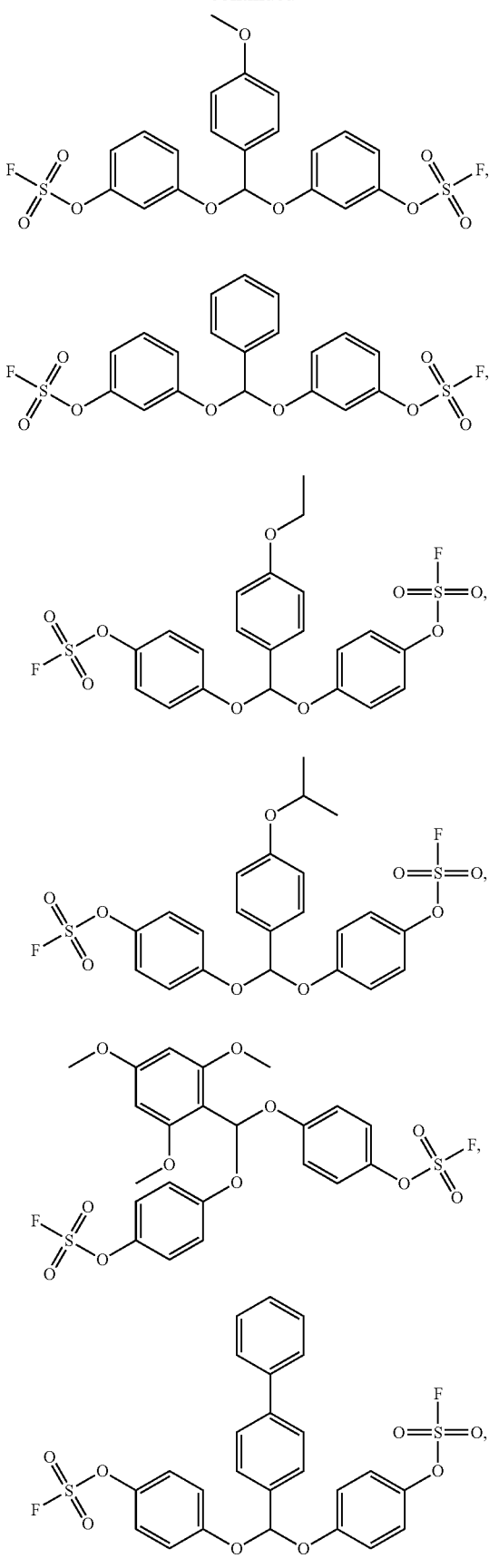

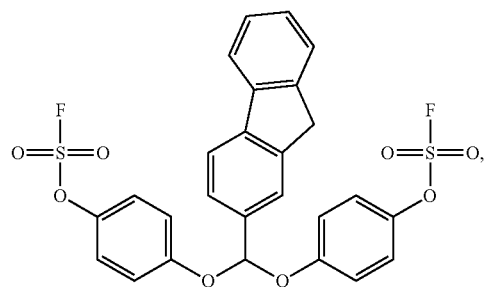
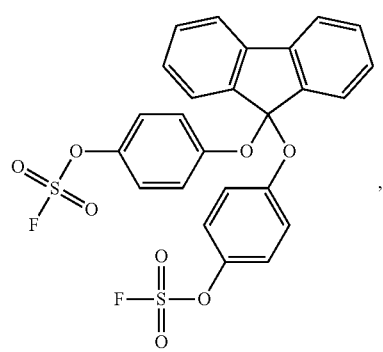
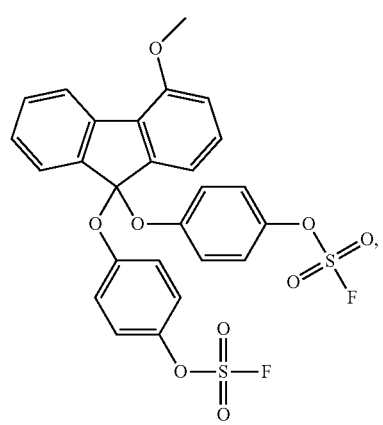
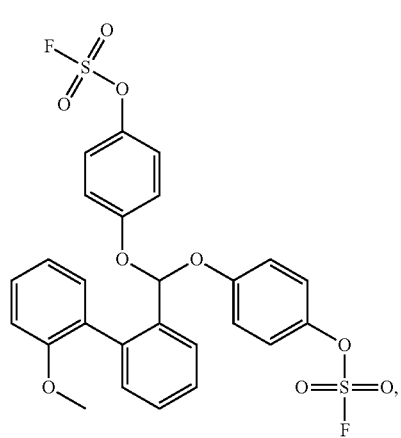
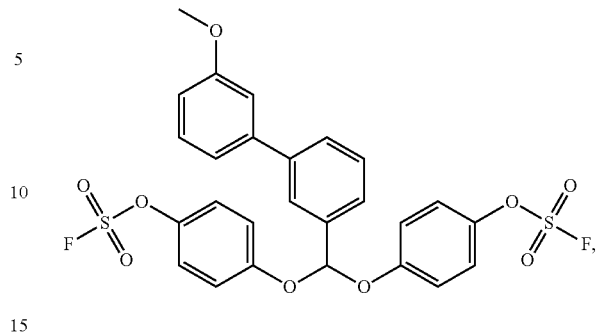
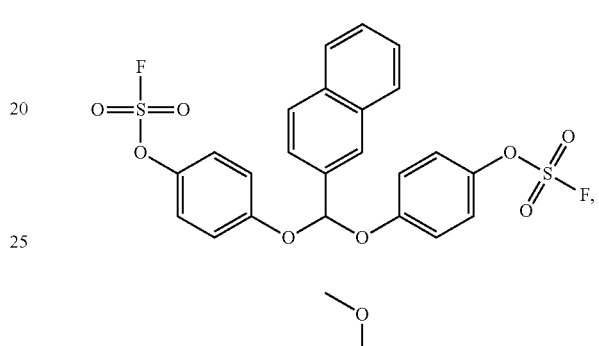
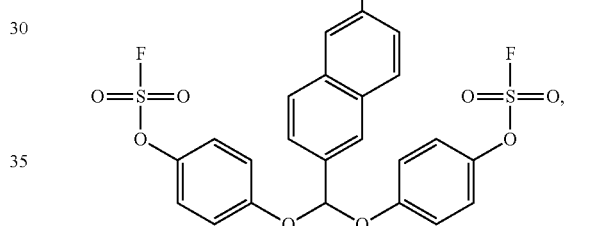
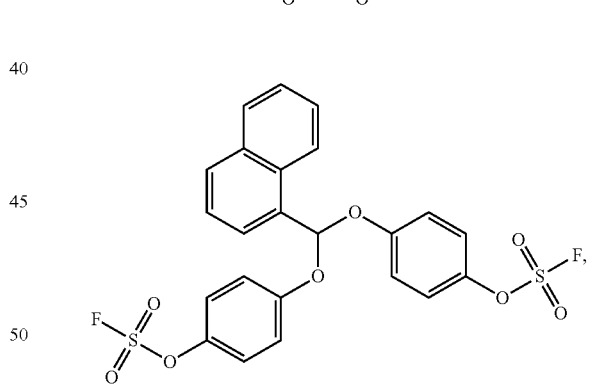
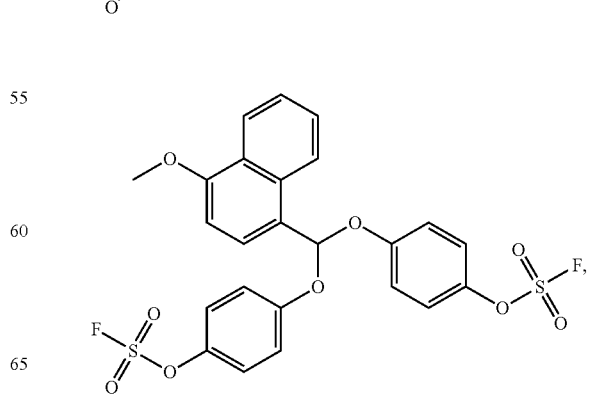

51
-continued
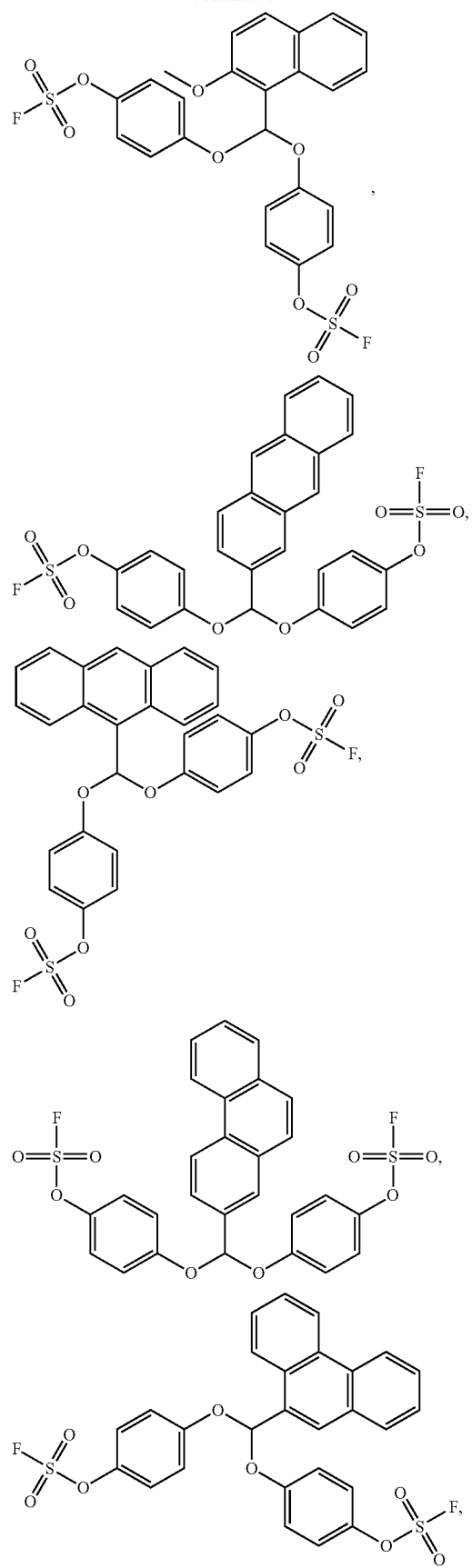
52
-continued
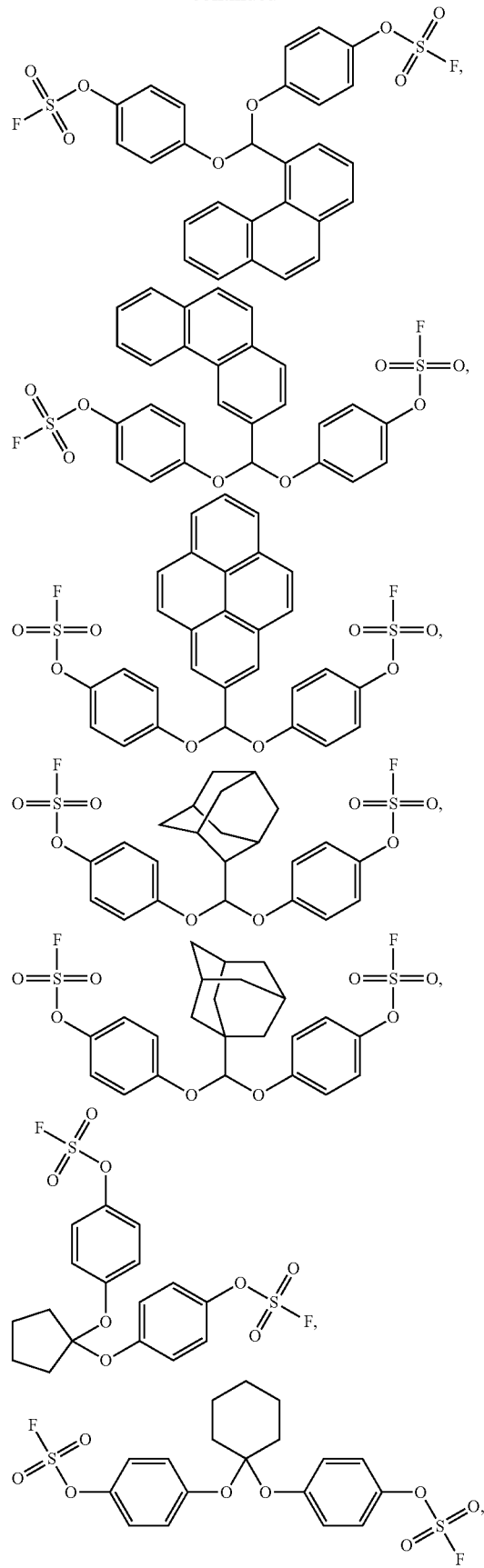

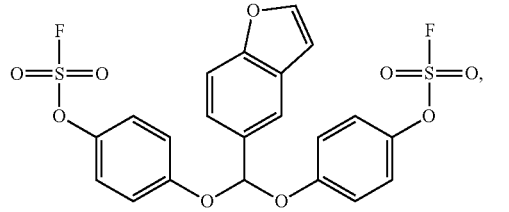
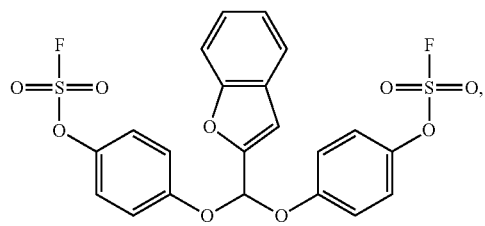
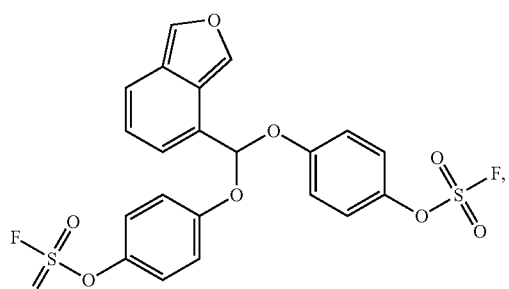
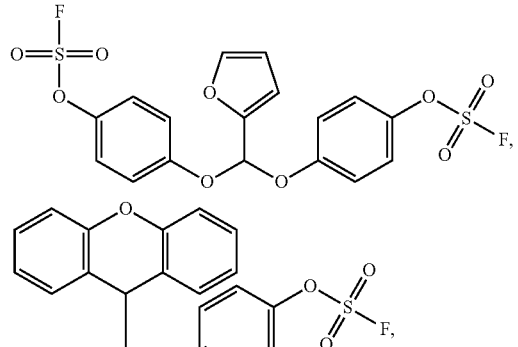
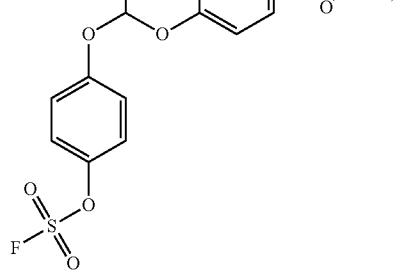
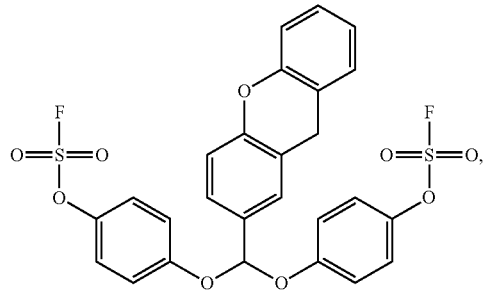
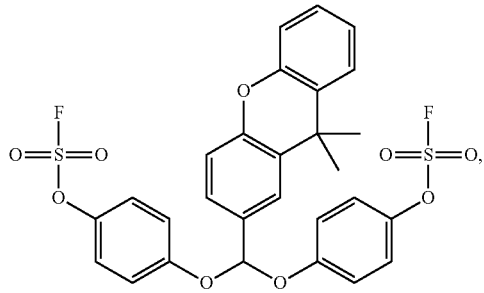
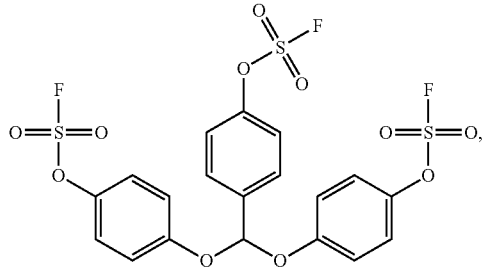
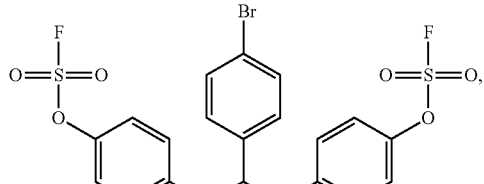
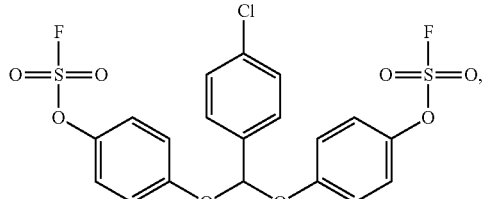
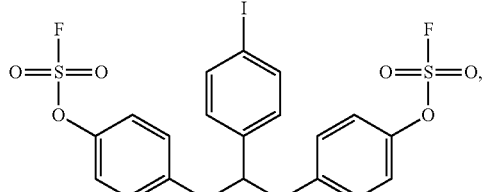
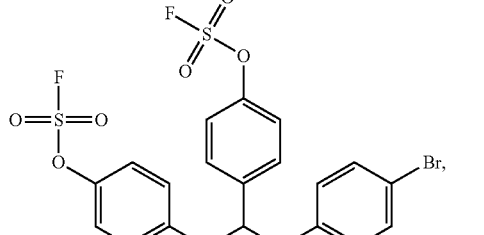
and combinations thereof.
9. The method of claim 1, wherein the monomer comprises the first monomer having structure (1), and wherein the first monomer having structure (1) is selected from the group consisting of

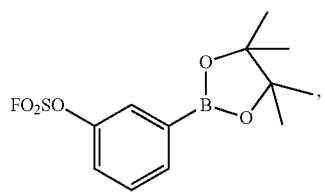
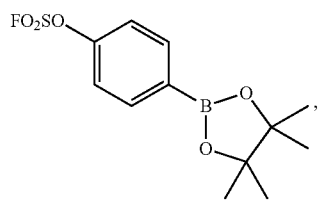
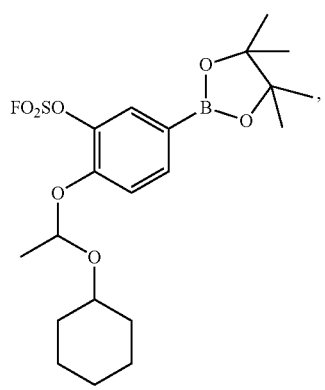
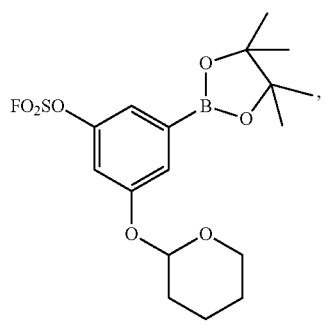
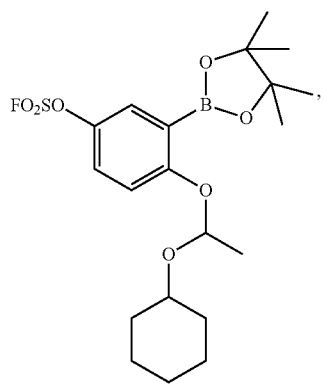
-continued
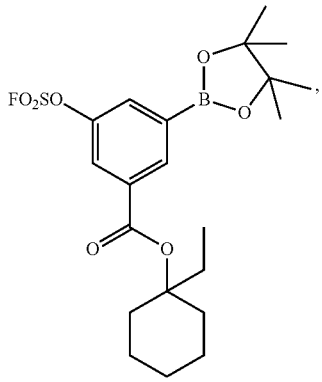
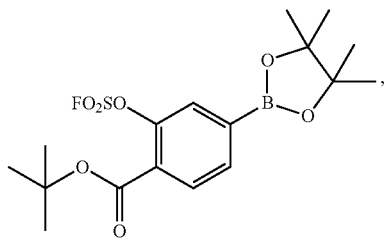
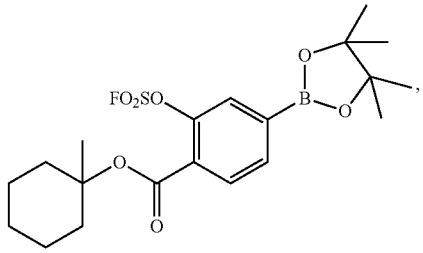
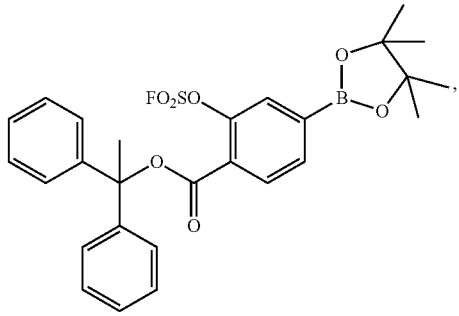
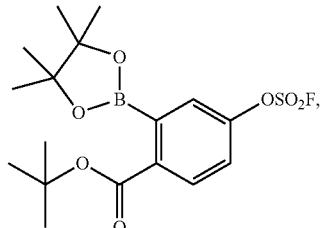
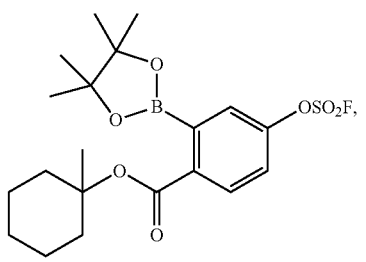

57
-continued
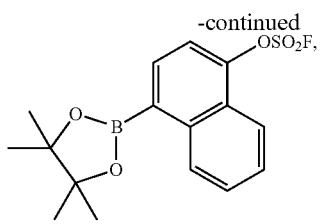
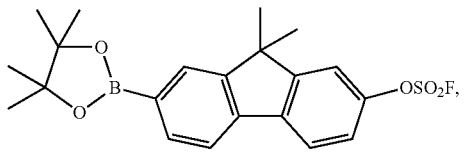
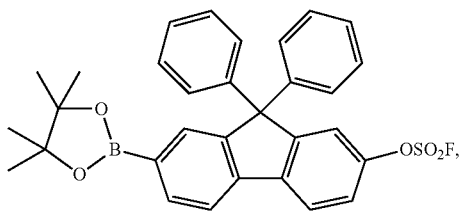
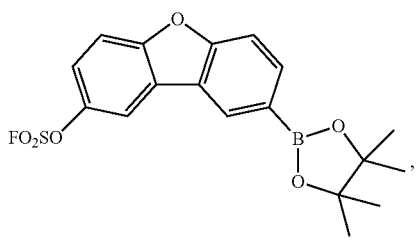
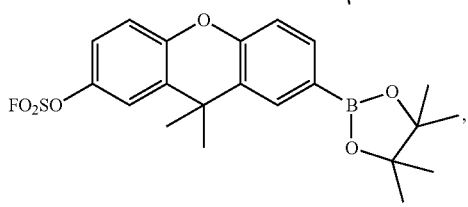
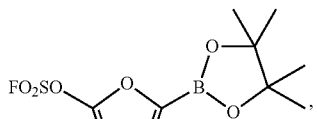
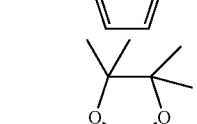
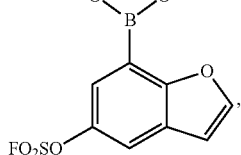
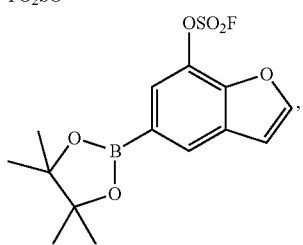
58
-continued
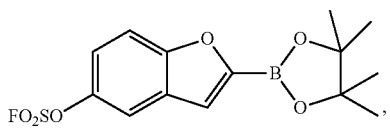
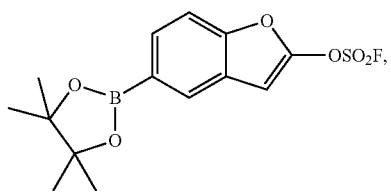
and combinations thereof; or
wherein the monomer comprises the first comonomer having structure (2) and the second comonomer having structure (3), and wherein the first comonomer having structure (2) is selected from the group consisting of
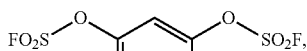
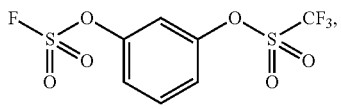
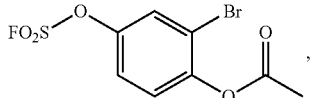
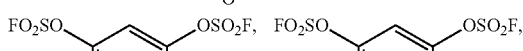
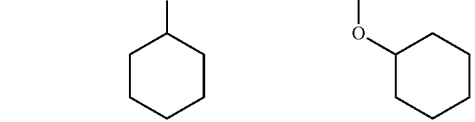
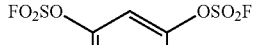
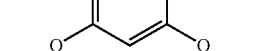
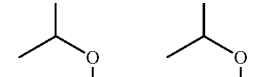
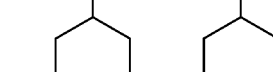
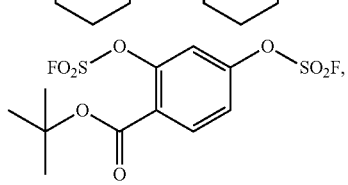

-continued
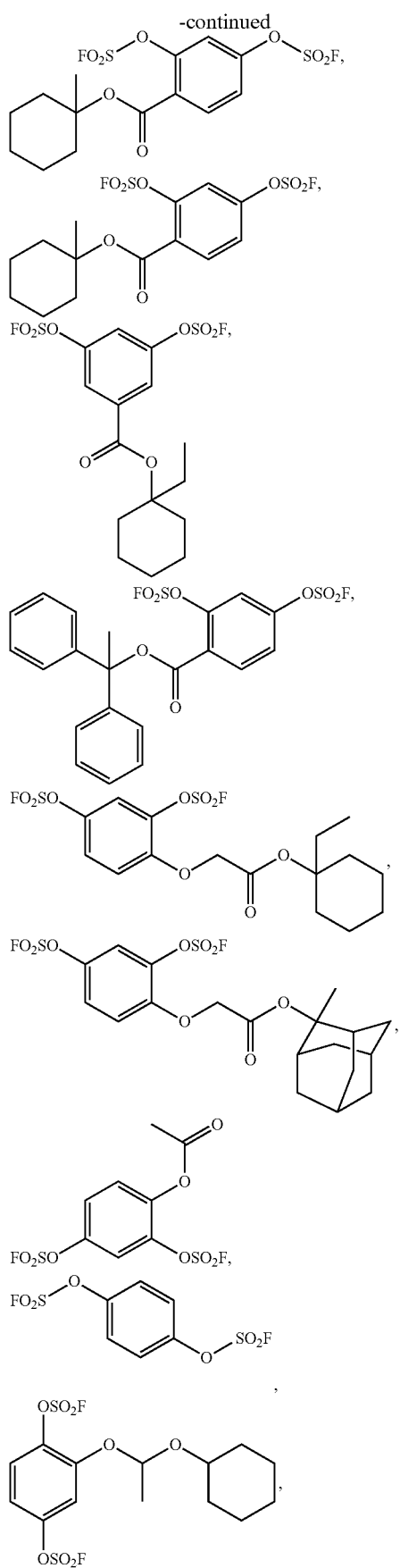
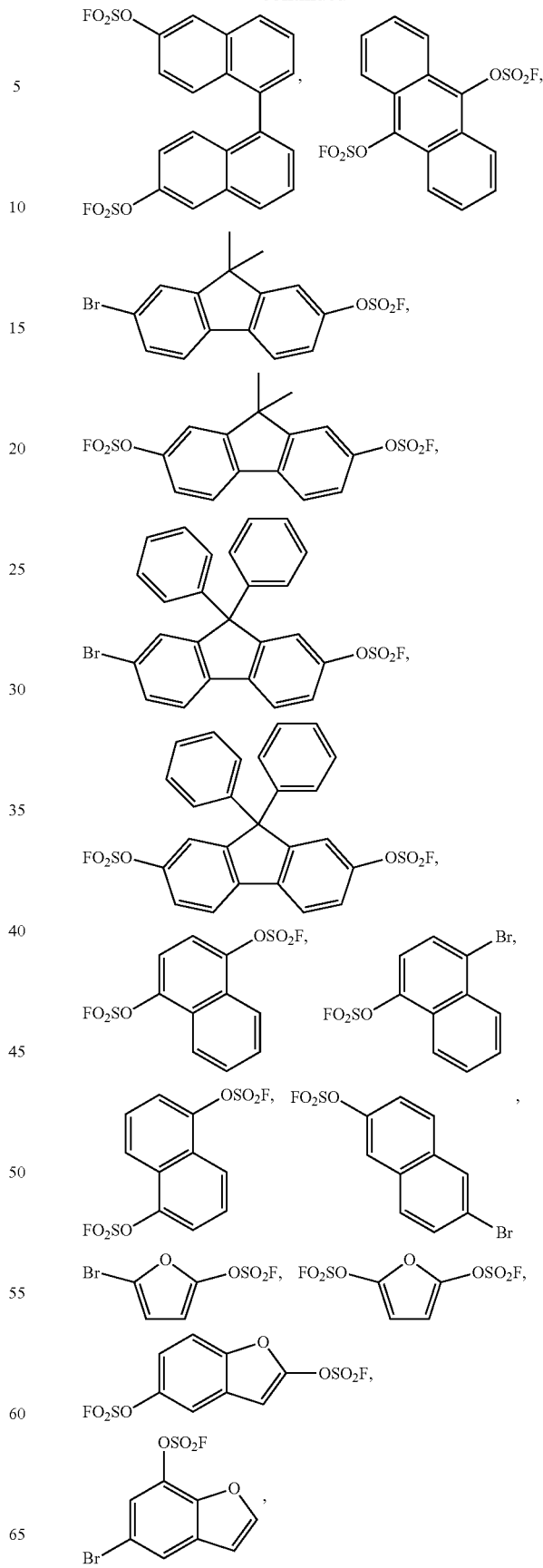

-continued

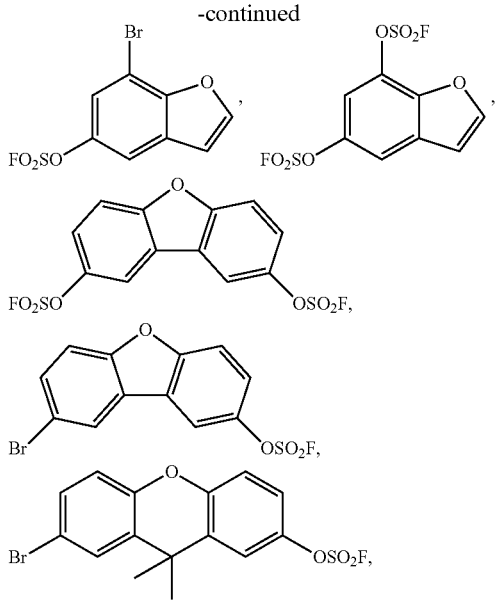

and combinations thereof.

10. The method of claim 1,
wherein the catalyst comprises a group 10 atom; and
wherein the base is selected from the group consisting of lithium carbonate, sodium carbonate, potassium carbonate, rubidium carbonate, cesium carbonate, ammonium carbonate, substituted ammonium carbonates, hydrogen carbonates, lithium phosphate, sodium phosphate, potassium phosphate, rubidium phosphate, cesium phosphate, ammonium phosphate, substituted ammonium phosphates, hydrogen phosphates, lithium acetate, sodium acetate, potassium acetate, rubidium acetate, cesium acetate, ammonium acetate, substituted ammonium acetates, formate salts, fluoroacetate salts, propionate anions with lithium, sodium, potassium, rubidium, cesium, ammonium, and substituted ammonium cations, lithium hydroxide, sodium hydroxide, potassium hydroxide, magnesium dihydroxide, calcium dihydroxide, strontium dihydroxide, and barium dihydroxide, aluminum trihydroxide, gallium trihydroxide, indium trihydroxide, thallium trihydroxide, triethylamine, N,N-diisopropylethylamine, 1,4-diazabicyclo[2.2.2]octane, 1,5-diazabicyclo[4.3.0]non-5-ene, 1,8-diazabicyclo[5.4.0]undec-7-ene, lithium, sodium, and potassium salts of bis(trimethylsilyl)amide, lithium, sodium, and potassium salts of t-butoxide, 1,8-bis(dimethylamino)naphthalene, pyridine, morpholine, 2,6-lutidine, triethylamine, N,N-dicyclohexylmethylamine, diisopropylamine, sodium fluoride, potassium fluoride, cesium fluoride, silver fluoride, tetra butyl ammonium fluoride, ammonium fluoride, triethyl ammonium fluoride, and combinations thereof.

\* \* \* \* \*